United States Patent
Kolar et al.

(10) Patent No.: US 11,253,106 B2
(45) Date of Patent: Feb. 22, 2022

(54) INTERLOCKING BLENDING SYSTEM

(71) Applicant: VITA-MIX MANAGEMENT CORPORATION, Olmsted Township, OH (US)

(72) Inventors: David J. Kolar, Stow, OH (US); Saifur T. Tareen, Copley, OH (US); Eric Miller, Olmsted Township, OH (US); Alan Pilch, Olmsted Township, OH (US); David Kanning, Valley City, OH (US)

(73) Assignee: Vita-Mix Management Corporation, Olmsted Township, OH (US)

( * ) Notice: Subject to any disclaimer, the term of this patent is extended or adjusted under 35 U.S.C. 154(b) by 0 days.

(21) Appl. No.: 16/880,261

(22) Filed: May 21, 2020

(65) Prior Publication Data

US 2020/0275807 A1 Sep. 3, 2020

Related U.S. Application Data

(63) Continuation-in-part of application No. 16/571,485, filed on Sep. 16, 2019, which is a continuation of
(Continued)

(51) Int. Cl.
*A47J 43/07* (2006.01)
*A47J 43/046* (2006.01)
(Continued)

(52) U.S. Cl.
CPC ......... *A47J 43/0777* (2013.01); *A47J 43/046* (2013.01); *A47J 43/0761* (2013.01);
(Continued)

(58) Field of Classification Search
CPC .. A47J 43/075; A47J 43/0761; A47J 43/0766; A47J 43/0772; A47J 43/0777
See application file for complete search history.

(56) References Cited

U.S. PATENT DOCUMENTS

| 2,372,862 A | 4/1945 | Strauss et al. |
| 3,175,594 A | 3/1965 | Jepson et al. |
| (Continued) | | |

FOREIGN PATENT DOCUMENTS

| DE | 102005040513 | 3/2007 |
| EP | D46169 | 2/1982 |
| WO | 2010052631 | 5/2010 |

OTHER PUBLICATIONS

International Search Report and the Written Opinion of the International Searching Authority, PCT/US2016/029165, VITA-MIX Management Corporation, Aug. 2, 2016.
(Continued)

*Primary Examiner* — Elizabeth Insler
(74) *Attorney, Agent, or Firm* — McDonald Hopkins LLC

(57) ABSTRACT

A blender system that includes a base that is selectively and operatively engaged with a container and an open and closable enclosure is shown and described herein. The base may include an interlock component that may interact with an interlock component of an enclosure or a container. The base also includes a motor that is selectively and operatively engaged with a blade disposed within the container. The motor may be controlled based on arrangement of the base, the enclosure, or the container.

20 Claims, 18 Drawing Sheets

Related U.S. Application Data application No. 15/137,575, filed on Apr. 25, 2016, now Pat. No. 10,413,131, which is a continuation-in-part of application No. 15/799,317, filed on Oct. 31, 2017.

(60) Provisional application No. 62/415,043, filed on Oct. 31, 2016, provisional application No. 62/265,554, filed on Dec. 10, 2015, provisional application No. 62/152,380, filed on Apr. 24, 2015.

(51) Int. Cl.
*A47J 43/08* (2006.01)
*H04B 5/00* (2006.01)

(52) U.S. Cl.
CPC ......... *A47J 43/0766* (2013.01); *A47J 43/085* (2013.01); *H04B 5/0037* (2013.01)

(56) References Cited

U.S. PATENT DOCUMENTS

| | | | |
|---|---|---|---|
| D237,503 S | 11/1975 | Langmack, Jr. et al. | |
| 3,961,721 A | 6/1976 | Gordon et al. | |
| D295,012 S | 4/1988 | Gelber | |
| 4,822,175 A | 4/1989 | Barnard et al. | |
| D301,824 S | 6/1989 | Machuron | |
| 4,883,144 A | 11/1989 | Haushalter et al. | |
| D321,647 S | 11/1991 | Oldorf | |
| 5,533,577 A | 7/1996 | Jucker | |
| 5,533,797 A | 7/1996 | Gelber | |
| 5,533,806 A | 7/1996 | Veltrop | |
| 5,696,358 A | 12/1997 | Pfordresher | |
| D406,154 S | 2/1999 | Copland et al. | |
| 5,957,577 A * | 9/1999 | Dickson ................ | A47J 43/07 366/197 |
| 6,059,445 A | 5/2000 | St. John et al. | |
| D426,423 S | 6/2000 | Lee | |
| D427,016 S | 6/2000 | Kindig et al. | |
| D428,564 S | 7/2000 | Kao | |
| D432,864 S | 10/2000 | Kindig | |
| D466,761 S | 12/2002 | Stuart et al. | |
| 6,513,396 B2 | 2/2003 | Nakamura | |
| 6,571,908 B2 | 2/2003 | Bohannon et al. | |
| D471,059 S | 3/2003 | Chuang | |
| 7,018,091 B2 | 3/2006 | Arroubi et al. | |
| D526,845 S | 8/2006 | Katz et al. | |
| D528,364 S | 9/2006 | Kolar | |
| 8,226,021 B2 | 7/2012 | Wilson | |
| 8,287,180 B2 | 10/2012 | Kolar | |
| 8,403,556 B2 | 3/2013 | Wu | |
| 8,529,118 B2 | 9/2013 | Davis | |
| 8,807,818 B2 | 2/2014 | Hirahata | |
| 8,702,300 B2 | 4/2014 | Audette | |
| RE45,308 E | 12/2014 | Kolar et al. | |
| RE45,655 E | 8/2015 | Kolar et al. | |
| 2002/0079393 A1 | 6/2002 | Karkos et al. | |
| 2003/0034200 A1 | 2/2003 | Bohannon et al. | |
| 2003/0042805 A1 | 3/2003 | Bates et al. | |
| 2005/0152215 A1 | 7/2005 | Stuart et al. | |
| 2011/0248108 A1 | 10/2011 | Carriere | |
| 2012/0027902 A1 | 2/2012 | Audette et al. | |
| 2012/0206995 A1 | 8/2012 | Wu | |
| 2013/0074706 A1 | 3/2013 | Fevre | |
| 2014/0001296 A1 | 1/2014 | Gen | |
| 2014/0217211 A1 | 8/2014 | Sanford et al. | |
| 2014/0286120 A1 * | 9/2014 | Kolar ................ | B01F 15/00207 366/142 |
| 2015/0035381 A1 | 2/2015 | Mach et al. | |
| 2016/0079774 A1 | 3/2016 | Baarman et al. | |

OTHER PUBLICATIONS

Extended European Search Report for Patent Application No. 20153842.8 dated May 19, 2020.

* cited by examiner

INTERLOCKING BLENDING SYSTEM

CROSS-REFERENCE TO RELATED APPLICATION

This application is a continuation-in-part of, U.S. patent application Ser. No. 15/799,317 filed on Oct. 31, 2017, entitled "REMOVABLE ENCLOSURE FOR A BLENDER," which claims priority to U.S. Provisional Patent Application No. 62/415,043 filed on Oct. 31, 2016, entitled "REMOVABLE ENCLOSURE FOR A BLENDER," and this application is a continuation-in-part of U.S. patent application Ser. No. 16/571,485 filed on Sep. 16, 2019, entitled "INTERLOCKING BLENDING SYSTEM," which is a continuation of, U.S. patent application Ser. No. 15/137,575, now U.S. Pat. No. 10,413,131 filed on Apr. 25, 2016 entitled "INTERLOCKING BLENDING SYSTEM," which claims priority to U.S. Provisional Application No. 62/152,380, entitled "INDUCTIVE INTERLOCK SYSTEM," filed on Apr. 25, 2015, and U.S. Provisional Application No. 62/265,554, entitled "INTERLOCKING BLENDING SYSTEM," filed on Dec. 10, 2015, which are all hereby incorporated by reference in their entirety.

TECHNICAL FIELD

The present teachings relate to an interlock system for a blender, and more particularly, to a blender system including an enclosure for the interlocking a blender system.

BACKGROUND

Blender systems are often used to blend and process foodstuffs. Conventional blenders generally include a base with a motor, and a mixing container with an operable mixing blade disposed therein. A blender lid is adapted to cover the mixing container. A user inserts contents within the mixing container to be mixed by the rotation of the blade. The container is positioned on the base as a user controls the operation of the motor within the base to rotate the mixing blade within the container to mix the contents therein.

It may be desirable to generally prevent the mixing blades from rotating when the blender lid is completely removed from the container. Interlock systems may be utilized to attempt to prevent the mixing blades from rotating when the blender lid is not positioned on the container. These interlock systems generally prevent the operation of the rotation of the mixing blade unless the blender lid is covering the mixing container. Known blending interlock systems have been disclosed by U.S. Pat. No. 13,403,556 to Wu to include a latch cover mechanism with a link rod and a compression spring in communication with a power circuit control switch in the base of the blender. Additionally, U.S. Pat. No. 13,702,300 to Audette discloses a blending apparatus having a container, a lid for covering the container, and an attachment within the container. The attachment engages the lid and a drive member at the base of the blender to actuate a motor once the lid is secured to the container.

Typically, known blender interlocks require a physical connection between the lid and the motor. These interlocks generally include a system of mechanical arms, links, springs or other attachments that prevent the user from operating the motor to rotate the mixing blade unless the blender lid is secured onto the container. Generally, known blender system interlocks are subject to damage or failure caused by the vibrations of the operating motor, normal wear, users, or the like. These interlock mechanisms can fail and cause a false actuation, giving a signal that the blender lid is in place when, in fact, it is not. Further still, these mechanical systems may be difficult to clean.

Additionally, mechanical interlock systems take up extra space for mechanical connection paths, and these connection paths may not allow for sufficient vibration isolation or damping.

Furthermore, traditional blender systems may be designed to utilize a particular blending container with a particular blending base. For example, a blender base may have a dedicated blending container that is designed to attach to the blender base. If a user attaches the wrong blending container to the blender base, then the blender may not function properly. This can lead to spilled contents, excess noise, improper functioning of the blades, or the like.

Many electrically powered food processors, also referred to as blenders, create considerable noise when in operation. Owing to the considerable number of high speed moving parts, mechanisms must also be employed to ensure the safe and secure operation of such machines. For example, blenders commonly employ a base containing an electric motor and its attendant controls. A container is then fitted onto this base so as to engage the drive shaft associated with the motor in order to propel one or more blades associated with the container to chop, mix, puree, or otherwise blend foodstuffs placed within the container.

A variety of enclosures fitting over or integral with the blending container have been developed, with an eye toward improving the overall operation and experience in using a blender. For example, U.S. Pat. No. Design D427,016 discloses one such ornamental enclosure. U.S. Pat. No. RE45,655 discloses an enclosure designed to reduce the noise level of the blender, by providing a hinged enclosure affording access to the container while remaining seated around the periphery of the base. Both of the patents are incorporated by reference as if fully rewritten herein.

Other approaches include hinged boxes which fully encase both the base and enclosure. In comparison to the patented designs noted above, these devices tend to be bulky and cumbersome. Furthermore, these units may prevent the user from accessing controls and buttons located on the base itself.

In view of the foregoing, further improvements could be made with respect to reducing noise through the use of blender enclosures. In the same manner, an enclosure that integrates with the base unit in a manner which further enhances the user's overall experience would be welcome. Furthermore, there is a need for improved blender systems.

SUMMARY

A blender system is disclosed herein. The blender system may include a base including a motor and at least one first reed switch, and an enclosure including at least one first magnet wherein the enclosure is selectively positionable on the base and is selectively movable in a closed orientation and an open orientation, and wherein, the at least one first magnet actuates at least one first reed switch when the enclosure is in the closed orientation and is selectively positioned on the base. The base may permit driving of the motor when the at least one first magnet actuates the at least one first reed switch, and the base may prohibit driving of the motor when the at least one first magnet does not actuate the at least one first reed switch. The blender system may include a container selectively positionable on the base, such that the container is operatively enclosed by the enclosure when the enclosure is in the closed orientation and is selectively positioned on the base. The container may comprise at least one second magnet and wherein the base comprises at least one second reed switch, wherein the at least one second magnet actuates at least one second reed switch when the container is selectively and operatively positioned on the base. The base may permit driving of the motor when the at least one first magnet actuates the at least one first reed switch and the at least one second magnet actuates the at least one second reed switch, and the base may prohibit driving of the motor when the at least one of the at least one first magnet does not actuate the at least one first reed switch or the at least one second magnet actuates the at least one second reed switch. The base may permit driving of the motor when the at least one first magnet actuates the at least one first reed switch whether or not the at least one second magnet actuates the at least one second reed switch. In an aspect, the container may comprise a lid operatively positionable on the container, and wherein the base operatively detects whether the container and lid are operatively attached.

In another aspect, also disclosed is a blender system comprising a base including a motor and a first interlock component, a pedestal extending from the base, and an enclosure providing a sound barrier to said base. The enclosure comprises a body portion including sidewalls and a cover portion, wherein a blending container is operatively positionable on the pedestal such that the body portion and the cover portion enclose the container, wherein the cover is positionable in an open state and a closed state and a second interlock component operatively interacts with the first interlock component, and wherein the base operatively controls operation of the motor based at least in part on whether the first interlock component is interacting with the second interlock component. In an example, the first interlock component comprises a reed switch, and the second interlock component comprises a magnet. According to another aspect, the magnet is disposed within or on the cover portion of the enclosure such that the magnet interacts with the reed switch when the cover is in the closed state and does not interact with the reed switch when the cover is in the open state. In at least one example, the blending system may comprise a third interlock component, wherein the third interlock component is disposed within or on the cover portion of the enclosure, and wherein the second interlock component is disposed within the body portion of the enclosure. It is noted that the second interlock component may further operatively interact with the third interlock component, such that the base operatively controls operation of the motor based at least in part on the second interlock component interacting with the third interlock component, and the second interlock component interacting with the first interlock component. The second interlock component may include at least one reed switch and the third interlock component comprises a magnet. The first interlock component may comprise a first near-field communication device and the second interlock component comprises a second near-field communication device. In an aspect, the blending system may further comprise a container comprising a third interlock component. It is noted that the first interlock component may comprise a first near-field communication device, the second interlock component may comprise a second near-field communication device, and the third interlock component may comprise a third near-field communication device.

Further disclosed is a blender system comprising: a base comprising a motor and a control circuit comprising at least two proximity sensors; a container operatively attachable with a lid and a base; and an enclosure comprising a body and a cover. The control circuit operatively allows the motor to rotate a splined coupler in response to determining either that the blender system is in a first arrangement, wherein the enclosure is operatively attached to the base, or that the cover is in a closed position, or in a second arrangement, wherein the enclosure is not operatively attached to the base and the container and lid are operatively attached to the base. The first arrangement further comprises the container as operatively attached to the base. The first arrangement does not depend on whether or not the lid is operatively attached to the container, such that the control circuit operatively allows the motor to rotate a splined coupler when the blender system is in a first arrangement regardless of whether the lid is operatively attached to the container. In an aspect, the control circuit includes a computer processor.

DESCRIPTION OF THE DRAWINGS

Operation of the invention may be better understood by reference to the detailed description taken in connection with the following illustrations. These appended drawings form part of this specification, and any written information in the drawings should be treated as part of this disclosure. In the same manner, the relative positioning and relationship of the components as shown in these drawings, as well as their function, shape, dimensions, and appearance, may all further inform certain aspects of the invention as if fully rewritten herein. Wherein.

DETAILED DESCRIPTION

Figure 1A:
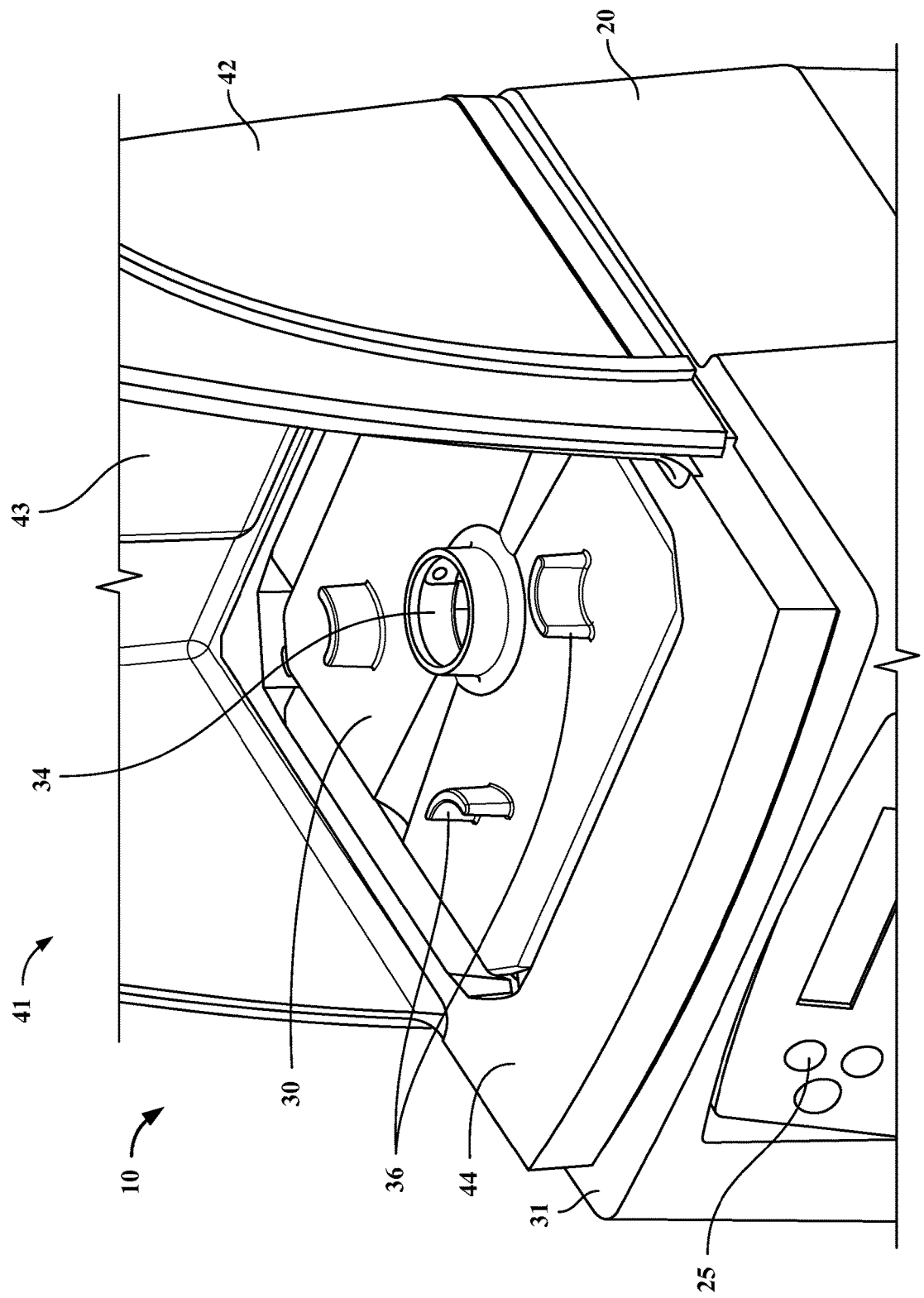
FIG. 1A is a three dimensional perspective view of certain aspects of the enclosure in an engaged, operational state in accordance with various disclosed aspects.
Figure 1B:
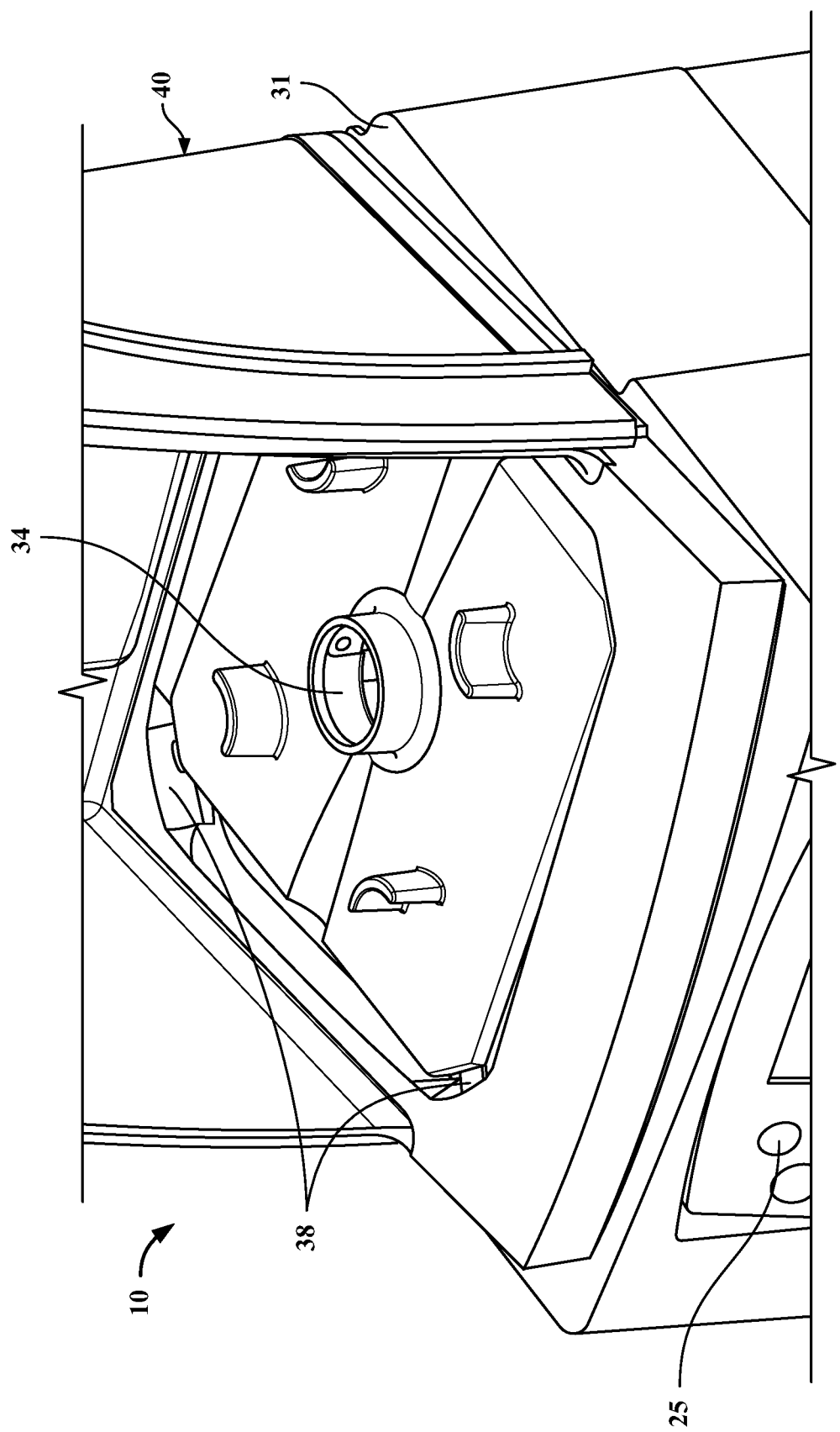
FIGS. 1B and 1C are, respectively speaking, three dimensional perspective views of certain aspects of the enclosure in a position wherein the enclosure's engagement members are disengaged, and wherein the enclosure is removed from the base in accordance with various disclosed aspects.

Reference will now be made in detail to embodiments of the present teachings, examples of which are illustrated in the accompanying drawings. It is to be understood that other embodiments may be utilized, and structural and functional changes may be made without departing from the scope of the present teachings. Moreover, features of the embodiments may be combined, switched, or altered without departing from the scope of the present teachings, e.g., features of each disclosed embodiment may be combined, switched, or replaced with features of the other disclosed embodiments. As such, the following description is presented by way of illustration and does not limit the various alternatives and modifications that may be made to the illustrated embodiments and still be within the spirit and scope of the present teachings.

As used herein, the words "example" and "exemplary" mean an instance, or illustration. The words "example" or "exemplary" do not indicate a key or preferred aspect or embodiment. The word "or" is intended to be inclusive rather an exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggest otherwise.

"Logic" refers to any information and/or data that may be applied to direct the operation of a processor. Logic may be formed from instruction signals stored in a memory (e.g., a non-transitory memory). Software is one example of logic. In another aspect, logic may include hardware, alone or in combination with software. For instance, logic may include digital and/or analog hardware circuits, such as hardware circuits comprising logical gates (e.g., AND, OR, XOR, NAND, NOR, and other logical operations). Furthermore, logic may be programmed and/or include aspects of various devices and is not limited to a single device.

It is noted that references to a blender, blender system, and the like, are understood to include food processor systems, and other mixing systems. Such systems generally include a blender base that may include a motor, a blade assembly, and a controller. Further, such systems may include a container, a display, a memory and/or a processor. A blade assembly, a blending container, and a blender base may removably or irremovably attach. The blending container may be powered in any appropriate manner, such as disclosed in U.S. patent application Ser. No. 14/213,557, entitled Powered Blending Container, which is hereby incorporated by reference.

Furthermore, while blending of "ingredients," "contents" or "foodstuffs" is described by various embodiments, it is noted that non-foodstuff may be mixed or blended, such as paints, epoxies, construction material (e.g., mortar, cement, etc.), and the like. Moreover, blending of ingredients may result in a blended product. Such blended products may include drinks, frozen drinks, smoothies, shakes, soups, purees, sorbets, butter (nut), dips or the like. Accordingly, such terms may be used interchangeably unless context suggests otherwise or warrants a particular distinction among such terms. Further, such terms are not intended to limit possible blended products and should be viewed as examples of possible blended products.

In embodiments, the blending systems may include any household blender and/or any type of commercial blending system, including those with covers that may encapsulate or partially encapsulate the blender. Commercial blending systems may include an overall blending system, such as a modular blending system that may include the blender along with other components, such as a cleaner, foodstuff storage device (including a refrigerator), an ice maker and/or dispenser, a foodstuff dispenser (a liquid or powder flavoring dispenser) or any other combination of such.

As used herein, the phrases "blending process," "blending program," and the like are used interchangeably unless context suggests otherwise or warrants a particular distinction among such terms. A blending process may comprise a series or sequence of blender settings and operations to be carried out by the blending device. In an aspect, a blending process may comprise at least one motor speed and at least one time interval for the given motor speed. For example, a blending process may comprise a series of blender motor speeds to operate the blender blade at the given speed, a series of time intervals corresponding to the given motor speeds, and other blender parameters and timing settings. The blending process may further include a ramp up speed that defines the amount of time the motor takes to reach its predetermined motor speed. The blending process may be stored on a memory and be recalled by, or communicated to, the blending device.

A blending system with interlocking capabilities is described herein. In an aspect, embodiments generally include a blender base (housing a motor), a near field communication (NFC) component(s), a container, and a lid. In an aspect, the blender system can determine whether the blender base, container, and lid are "interlocked" (e.g., that they are in an operative position whereby a user is prevented from contacting the blades). The NFC components are disposed in at least one of the blender base, container, or lid. When the blender system is fully connected, the NFC components may interact with each other. The interaction may allow operation of a motor and rotation of the blades within the container.

The terms "identification tag," "chip," "NFC component," and the like may be used interchangeably, unless context suggests otherwise or warrants a particular distinction among such terms. Such may refer to an NFC component or tag, which may be capable of sending/receiving a signal. It is noted that embodiments may utilize other radio frequency identification (RFID) devices, transponders, or tags. Accordingly, embodiments reference NFC for brevity, but such embodiments may utilize other RFID devices, methods, or systems. It is further noted that RFID tags may be chosen based on a frequency (e.g., low frequency RFID tags for close communication). Identification tags may comprise printable RFID tags, NFC tags, tags including microchips, or the like. Identification tags can contain stored information, such as in a memory (e.g., read-only memory (ROM), random access memory (RAM), electrically erasable programmable read-only memory (EEPROM), or various other types of memory). In another aspect, an identification tag may be powered by electromagnetic induction from magnetic fields produced by a reader. For instance, an identification tag may include an NFC component that uses induction between two loop antennas located within the container's near field, effectively forming an air-core transformer. The antennas may comprise various materials, such as copper. While an air-core transformer is described, various other antenna formations may be utilized.

In an example, an NFC component may include an NFC tag and an NFC emitter. The NFC tag and NFC emitter may each include one or more antennas. For instance, the NFC tag may include a loop antenna and the NFC emitter may include another loop antenna. It is noted that the loop antennas may or may not be substantially similar to each other. The NFC tag antenna and NFC emitter antenna may be operatively coupled via an electromagnetic field. The coupling may form or represent an air-core coil or transformer. The NFC emitter may generate an alternating current that may be received by the NFC emitter antenna. The current may induce an electromagnetic field through the air or another carrier medium. The electromagnetic field may induce a current in the NFC tag antenna. The received current may provide power to various components of the NFC tag.

In various embodiments, an NFC tag may include the antenna (e.g., inlay), a processor, and a memory device. The memory device may include various types of memory, such as electrically erasable programmable read-only memory (EEPROM) and the like. When the NFC tag is powered (e.g., current induced by the electromagnetic field), the NFC tag may generate a response that may be received by the NFC emitter.

As described herein, the identification tag may be a passive transponder that collects energy from interrogating radio waves and/or may include a local power source such as a battery. As such, an identification tag and a reader may be configured as a passive reader active tag (PRAT) system, active reader passive tag (ARPT) system, an active reader active tag (ARAT) system, or the like.

In another aspect, an identification tag may power various components or devices. For example, an NFC component may power a digital display and/or interface of a container. In embodiments, the identification tag may be configured to operate and/or communicate with a reader when within a threshold distance. For instance, an identification tag may communicate with a reader when the identification tag is less than or equal to j units from the reader, where j is a number and the unit is a unit of distance. In an example, the identification tag may operate when it is less than or about six centimeters from the reader, when it is less than or about one meter from the reader, etc.

Some traditional blender systems include a container that interlocks with a blender base via mechanical actuators. For example, a push rod or arm of a container may physically press a button of, or lock with, the blender base. Such blender systems may be prone to damage and failure. Additionally, the added mechanical actuators add to the size of blender systems.

In another aspect, containers may have an expected lifetime. The lifetime may be based on the amount of blending cycles, the total time spent blending, or the like. Traditional blender systems have no way of determining or tracking this information. For example, a restaurant may own multiple containers that may be utilized for a blender base. This allows the restaurant employees to make drinks or other products in one container, and to then make a drink in a different container while the first container is being cleaned. Traditional blending devices cannot determine if multiple containers are being utilized. Thus, users cannot know the amount of use associated with a container. Such knowledge may be beneficial if a container needs to be serviced after a pre-determined number of cycles—keeping track of the cycles may allow a notification to be produced to service the applicable container.

Aspects of systems, apparatuses or processes described herein generally relate to blending or mixing systems that include a blending container that may comprise an NFC component. The NFC component may be embedded into the container, attached to the container, or otherwise coupled with the container. The container may be placed on or connected to a blender base. The blender base may communicate and/or power the NFC component. Powering the NFC component may allow the NFC component to communicate with a processor within the blender base. For example, the processor may communicate with the NFC component to determine whether the container and blender base are interlocked, determine a container identification (ID) and/or characteristics (e.g., make/model), etc.

With reference to FIGS. 1A through 2C, the blender assembly 10 includes a blender base or base 20 and an enclosure 40. The base 20 encloses an electric motor (as described with reference to FIG. 5) connected to a power supply (e.g., alternating current, portable direct current power source, etc.). The motor may be controlled by a control panel 25, which may include any number of interface options, including an on/off switch, pre-programmed routines for adjusting the speed and duration of blending, and the like.

Figure 5:
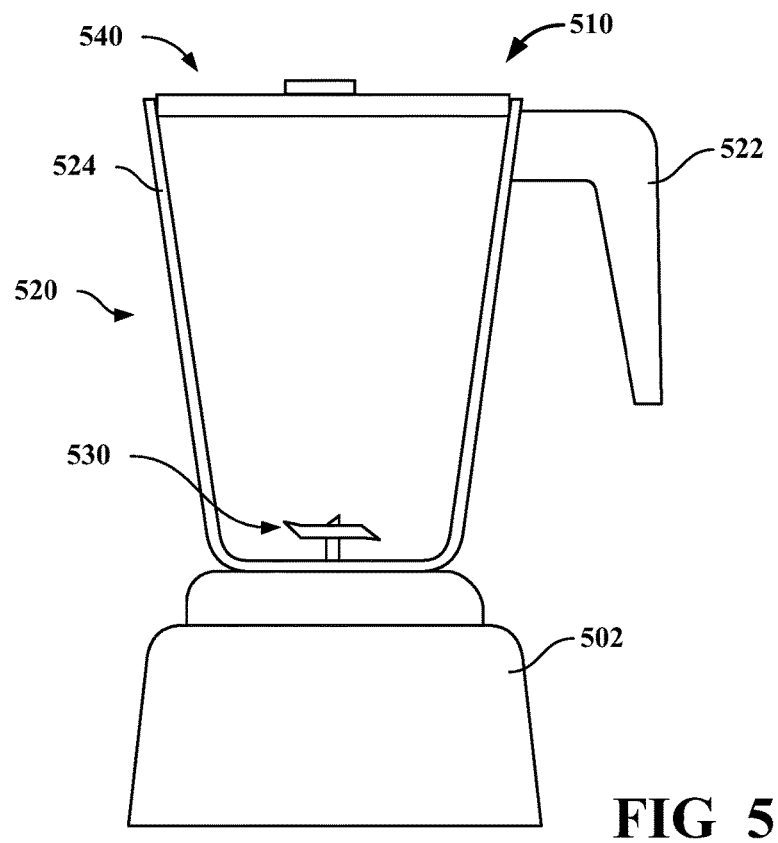
FIG. 5 illustrates an exemplary blending system in accordance with various disclosed aspects.

The base 20 also includes a raised pedestal 30 on a top surface of the base 20, which is adapted to be received in a base portion of a container (as shown in FIG. 5). The pedestal 30 may include one or more projections 36 extending upwardly therefrom which, when received by the base portion of the container, assist to prevent the container from rotating when the motor within the base 20 is actuated. The container may be shaped to engage the pedestal 30 at a variety of points, as will be described in more detail below.

Figure 1C:
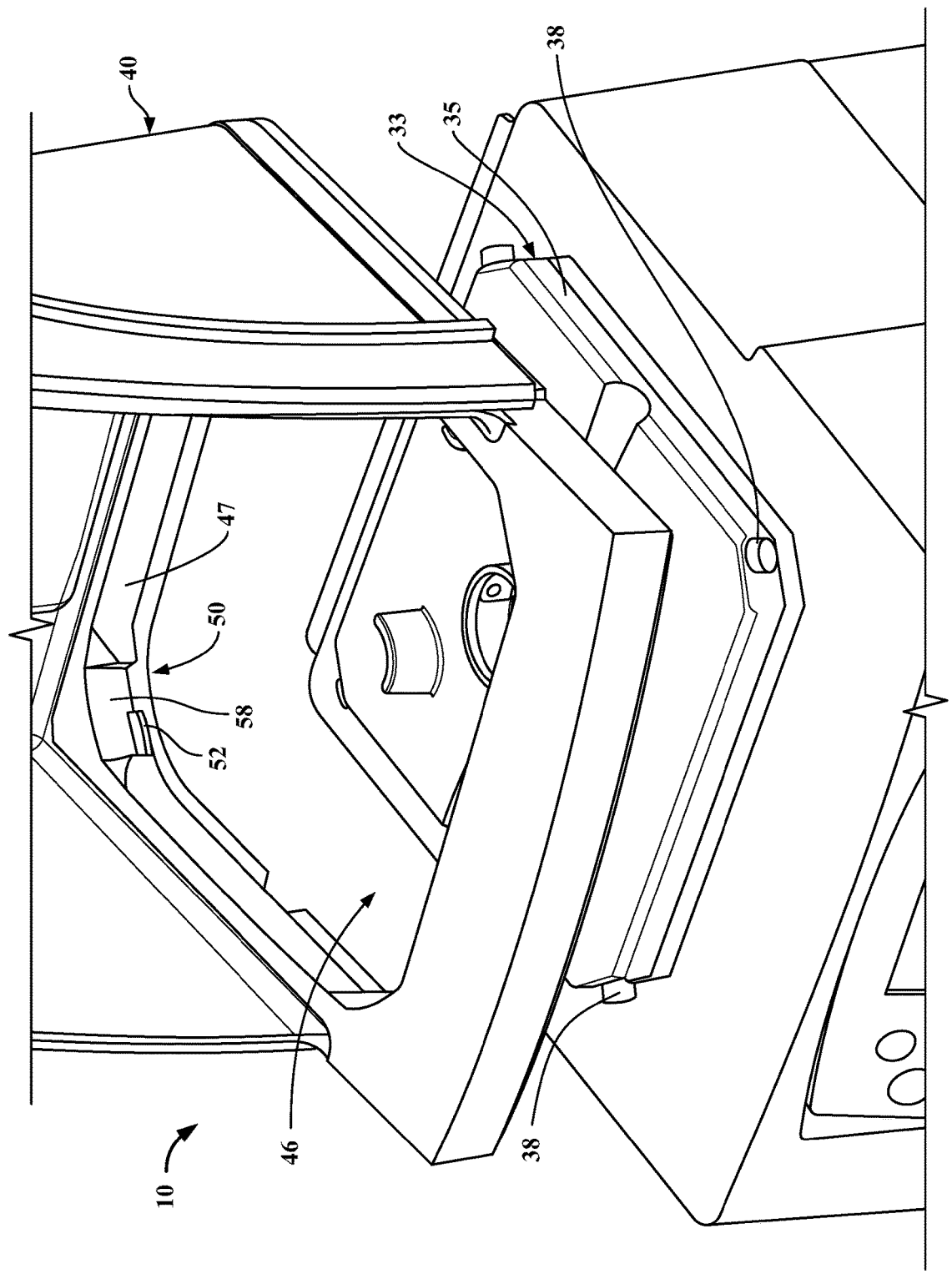
Figure 2A:
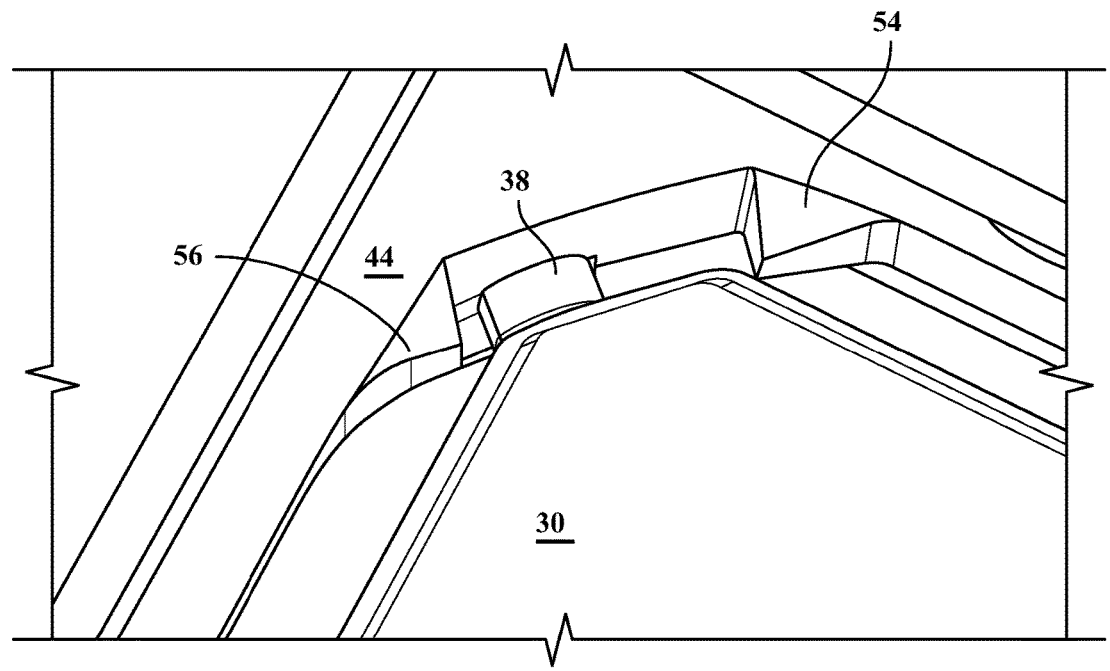
FIG. 2A is a three dimensional top view, corresponding to aspects depicted in FIG. 1A, of an engagement member in its engaged, operational state in accordance with various disclosed aspects.
Figure 2B:
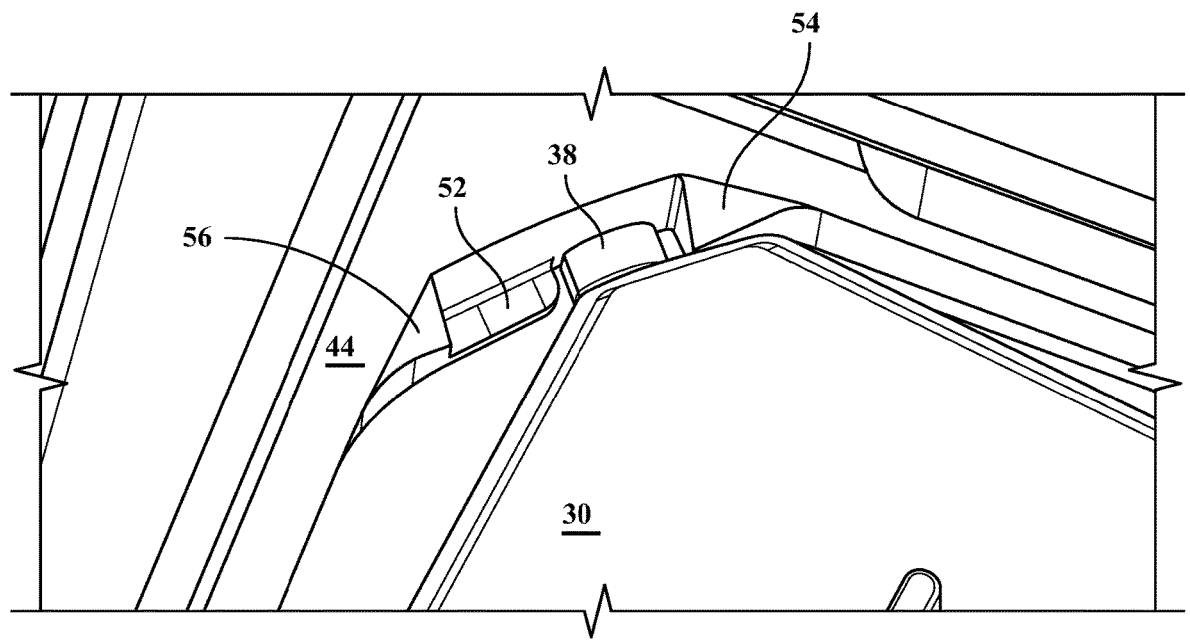
FIGS. 2B and 2C are, respectively speaking, three dimensional top views, corresponding to aspects depicted in FIGS. 1B and 1C, of an engagement member in the disengaged and removed state in accordance with various disclosed aspects.
Figure 2C:
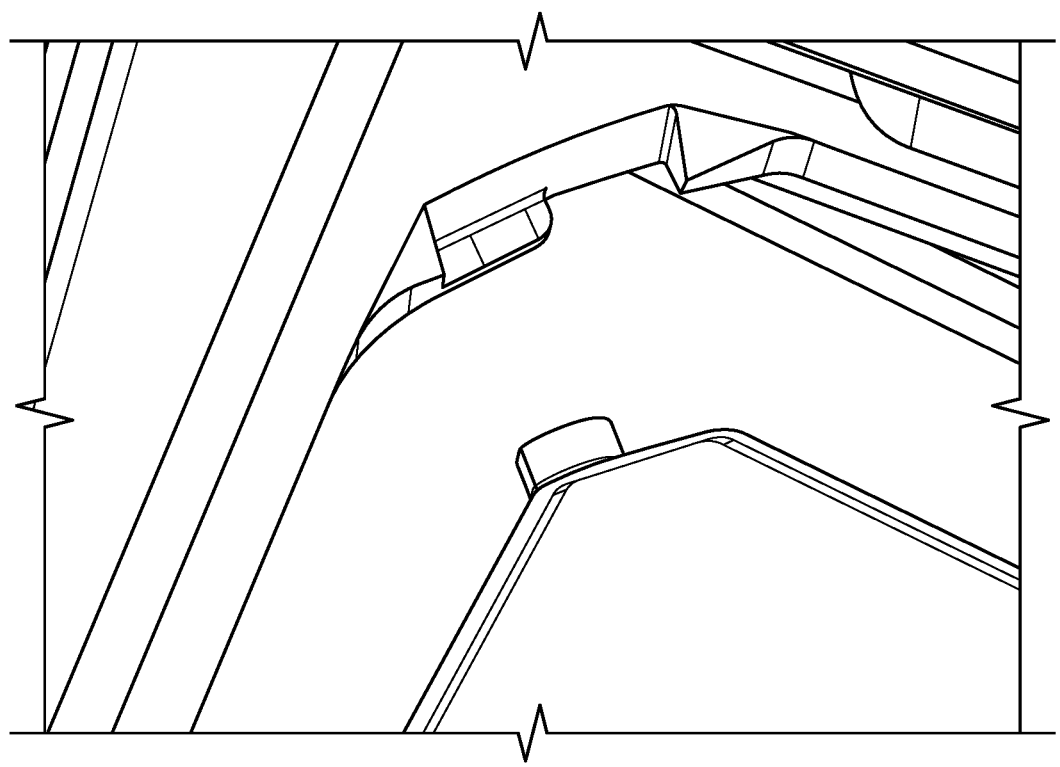

In embodiments, the pedestal 30 extends away from the base 20 in order to provide a point of engagement with the container. At the same time (and as is best illustrated in FIG. 1C), a peripheral edge 31 generally adjacent to the pedestal 30 forms a seating surface for an enclosure 40. The enclosure 40 may include a base 44 having corresponding structures therein, such that one or more seals or gaskets may conform with the peripheral edge 31 and/or the pedestal 30 so as to promote a more sound-proof and/or water-tight seal. It is noted that a gasket may be disposed between at least a portion of the base 44 and the base 20. The gasket may generally isolate or reduce vibrations between the base 20 and the enclosure 40.

The top facing portion of the pedestal 30 includes a coupler 34 for engaging the blade assembly of the container.

A splined drive shaft, which may extend from the blade assembly within the container, may engage a splined end of a rotating motor shaft within the coupler 34 that cooperates with the motor in the base 20. Rotation of the motor shaft caused by actuation of the motor is thereby transferred to the draft shaft and the blades rotatably positioned within the container. As such, the coupler 34 may include a complementary shaped end associated with the motor that is engageable with a shaft of the blade assembly to drive the blade assembly in the container. The one or more projections 36 may also be formed on the top facing of the pedestal 30 to better secure the container to the base 20. In some aspects, a plurality of projections 36 are formed with shapes that cooperate with corresponding recesses in the container.

The enclosure 40 includes a body portion 41 having opposed sidewalls 42 spanned by a rear wall 43, wherein the sidewalls 42 and rear wall 43 extend upwardly from the base 44 and define a cavity. The base 44 and the walls 42, 43 may be monolithically formed to one another, or may be made by separate components attached to one another. The body portion 41 may include an open front area opposed to the rear wall 43, and the front area may be closed by a cover (not shown) to form the enclosure 40. The enclosure 40 may be designed to generally surround the container as it is positioned on the pedestal 30. The cover may be hinged to open and close the enclosure 40 to allow for access therein and to allow the container to be positioned on the pedestal or be removed. In another aspect, a gasket may be disposed between the cover and one or more of the walls 42, 43. It is noted that gaskets may be utilized as described with reference to U.S. Pat. Applications RE45,655 and RE45,308, the entireties of which are incorporated by reference herein. The entirety of the enclosure 40, including the base 44, side walls 42, rear wall 43 and cover 40 may be selectively attached to the pedestal 30.

Figure 3:
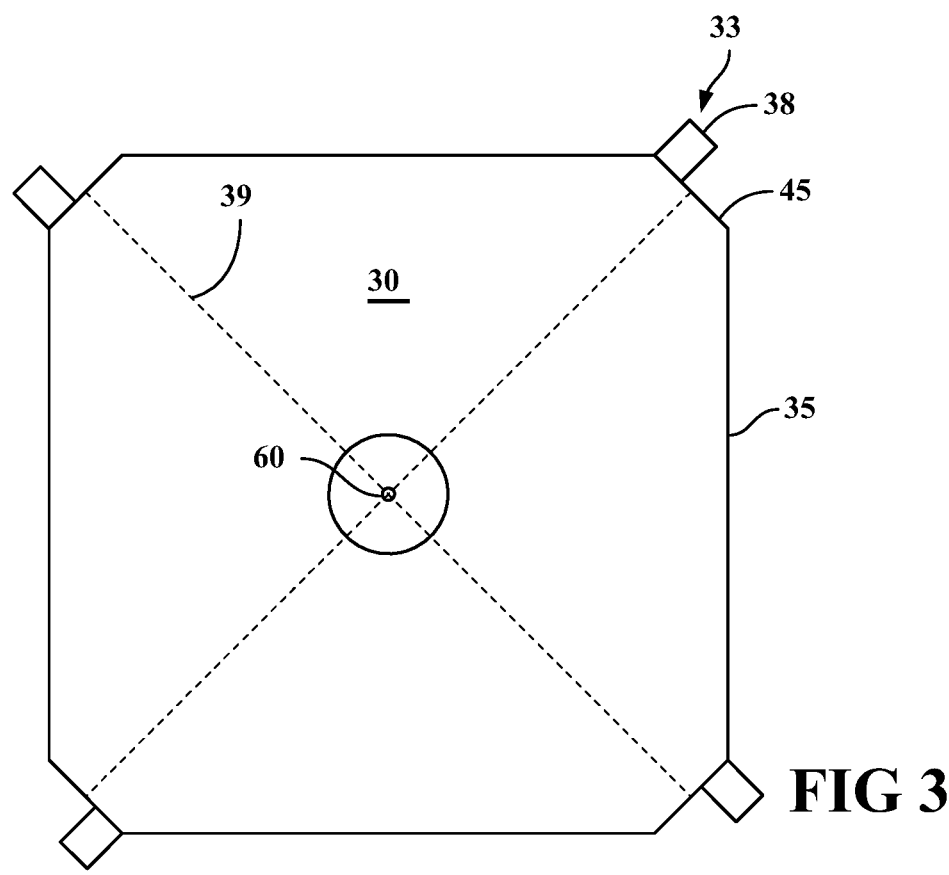
FIG. 3 illustrates a schematic plan view of an embodiment of a pedestal of a blender, in accordance with various disclosed aspects.

The pedestal 30 may also include a shape that cooperates with an aperture 46 in the enclosure 40. For example, the pedestal 30 may have a substantially square or rectangular profile when viewed from the top, with recessed or rounded edges 33. Other pedestal shapes are possible, including ovals or circles with flattened portions serving as the recessed edges and/or regular or irregular polygons. Engagement members 38 may extend orthogonally from pedestal sidewalls 35 as illustrated by FIG. 1C. In certain aspects, members 38 are provided along the recessed edges 33 in an arrangement wherein the members 38 all align with a central radius 39, wherein they may extend a common distance from a central axis 60 (FIG. 3). At least one member 38 is required, with additional members being preferred. In certain embodiments, four engagement members 38 are provided at the recessed edges 33 of a platform having a four-sided shape (when viewed form the top). In one embodiment, the rounded edges 33 may include a flat portion 45 adjacent to the engagement member 38.

Engagement members 38 cooperate with engagement channels 50 formed in a peripheral edge 47 of the base 44 of the enclosure 40. The peripheral edge 47 may generally define the aperture 46 within the base 44, wherein the aperture 46 may have a size that cooperates with the perimeter of the pedestal 30 to allow for the pedestal 30 to be received therein. As the pedestal 30 is received within the aperture 46, engagement members 38 may be aligned with and received within the engagement channel 50. The engagement channel 50 may include a retention lip 52, a guide stop 54, a back wall 56, and a top wall 58. After the pedestal 30 is received within the aperture 46, the enclosure 40 may be pivoted such that the engagement members 38 may be aligned through the channel 50 and into a locking position adjacent to the back wall 56. The engagement members 38 may frictionally move about along the retention lip 52 and be positioned towards the back wall 56 when the enclosure 40 is pivoted into an engaged position with the pedestal 30.

Further protrusions, friction-fitting grooves, spring-loaded pegs, or other similar mechanisms may provide nominal resistance and/or produce an audible clicking sound to alert the user when the members 38 are in the engaged/locked position. In some aspects, this indication may involve visual and/or audible aspects, such as light emitting diode indicators, a graphical display, an alert signal, a voice message, and the like. In further aspects, operation of the motor may be made contingent upon sensing proper installation of the enclosure.

In the same manner, some or all portions of interlock components, such as proximity sensors (e.g., a pressure/load sensor, a contact circuit, magnets coupled to reed switches, NFC tags, etc.) or actuators for proximity sensors may be provided in these respective parts, along with appropriate circuitry in the base 20 to provide an indication when the enclosure 40 is properly positioned as disclosed throughout this specification. In an example, the circuitry may comprise a control circuit disposed within the base 20. The control circuit may include or be communicatively coupled with one or more proximity sensors. In another aspect, the control circuit may include a processor communicatively coupled with the one or more proximity sensors as disclosed here and elsewhere in this specification.

Additional locking mechanisms might be provided so as to better secure and attach the enclosure to the base (for example, by way of additional projections, activation of electromagnets, and the like). These additional locking mechanisms can be designed so that they can be released while the motor is in operation. Additionally or alternatively, the additional locking mechanisms might be latches, pegs, or fasteners located at the interface of the peripheral edge 31 and enclosure 40 which the user positions before the motor can be engaged. Additionally, a bottom portion of the base 44 may rest on the peripheral edge 31 of the base 20 when the enclosure 40 is in the engaged or locked position.

The entirety of the enclosure 40, including the base 40, side walls 42, and the top portion including a pivoting opening (not shown), may be rotated relative to the base 20 to allow for such tactile engagement. While the aperture 46 in the figures is shown to have a substantially similar shape as that of the pedestal 30 (i.e., generally square), it may be possible to provide differing shapes for the pedestal and enclosure so long as sufficient engagement between the pedestal 30 and the enclosure 40 can be achieved at a plurality of points (e.g., a circle fitting within a square, etc.). Additional structure may be included in the channel 50 and/or along other contact points between the base 44, walls 35, and/or peripheral edge 31, and these portions may be partially constructed from materials which present resistance/friction when they are slid across their intended range of motion. Guides may also be fashioned in the peripheral edge 31 to simplify locating the proper orientation of the enclosure and base.

To disengage the enclosure 40 from the pedestal 30, the enclosure may be pivoted opposite from the initial direction, wherein the frictional engagement between the engagement members 38 and the retention lip 52 of the engagement channel 50 is overcome. Notably, feedback notice may be generated to the user in the form of a tactile pulse to the user, audible sound, visual display, or any combination of these notices.

The materials of the base 20, pedestal 30, and enclosure 40 may include of any type, although durable, moldable polymers may be particularly useful. Metal, glass, and ceramics may also be used. In the same manner, gaskets may be interposed at any of the contact points (i.e., enclosure to peripheral edge, within the engagement channel, etc.) to allow for a better seal. Such gaskets may be formed of amorphous polymers, semicrystalline polymers, biopolymers, bitumen materials, and the like.

In one embodiment, the pivoting of the enclosure 40 relative to the base 20 may be in the form of a slight rotation in a single, horizontal plane with a circular rotation between the elements. However, three dimensional movements could be accommodated in certain aspects, as the engagement members 38 and the engagement channels 50 may be provided in various orientations relative to one another to accomplish various pivoting movements. For example, channel 50 could be formed to include a retention lip 52 having a twisted or screw-like shape. In such aspects, the final resting place for the members 38 could be provided as a plateau, and/or with a resting groove. In the same manner, the members 38 and channels 50 need not be symmetrically situated, and varying elevations or positions could be used so as to prevent improper installation of the enclosure 40. In the same manner, the relative shape of the enclosure 40, its base 44, the pedestal 30, and/or the base 20 can be fashioned to provide additional visual cues for the user as to the correct installation. As noted above, proximity sensors such as electronic mechanic devices, reed switches, magnetic switches, load sensors, and other similar devices, can be employed in the base 20, the container, and/or other components (e.g., the enclosure, a container, a lid, etc.) for purposes of verifying installation, as well as allowing or preventing operation of the blender itself under certain conditions. For example, the proximity sensors may be utilized to identify or otherwise allow the base 20 to determine arrangement of various components such that the base 20 may determine whether the enclosure 40 is operatively attached to the base 20, whether the enclosure 40 is in an open condition or a closed condition, whether the container is operatively attached to the base 20, whether the lid is operatively attached to the container, or the like. In response to identifying the arrangement, the base 20 may allow operation of the motor (e.g., allow the motor to drive a splined coupler) or may prevent operation of the motor (e.g., prevent or stop the motor from driving the splined coupler).

Figure 12:
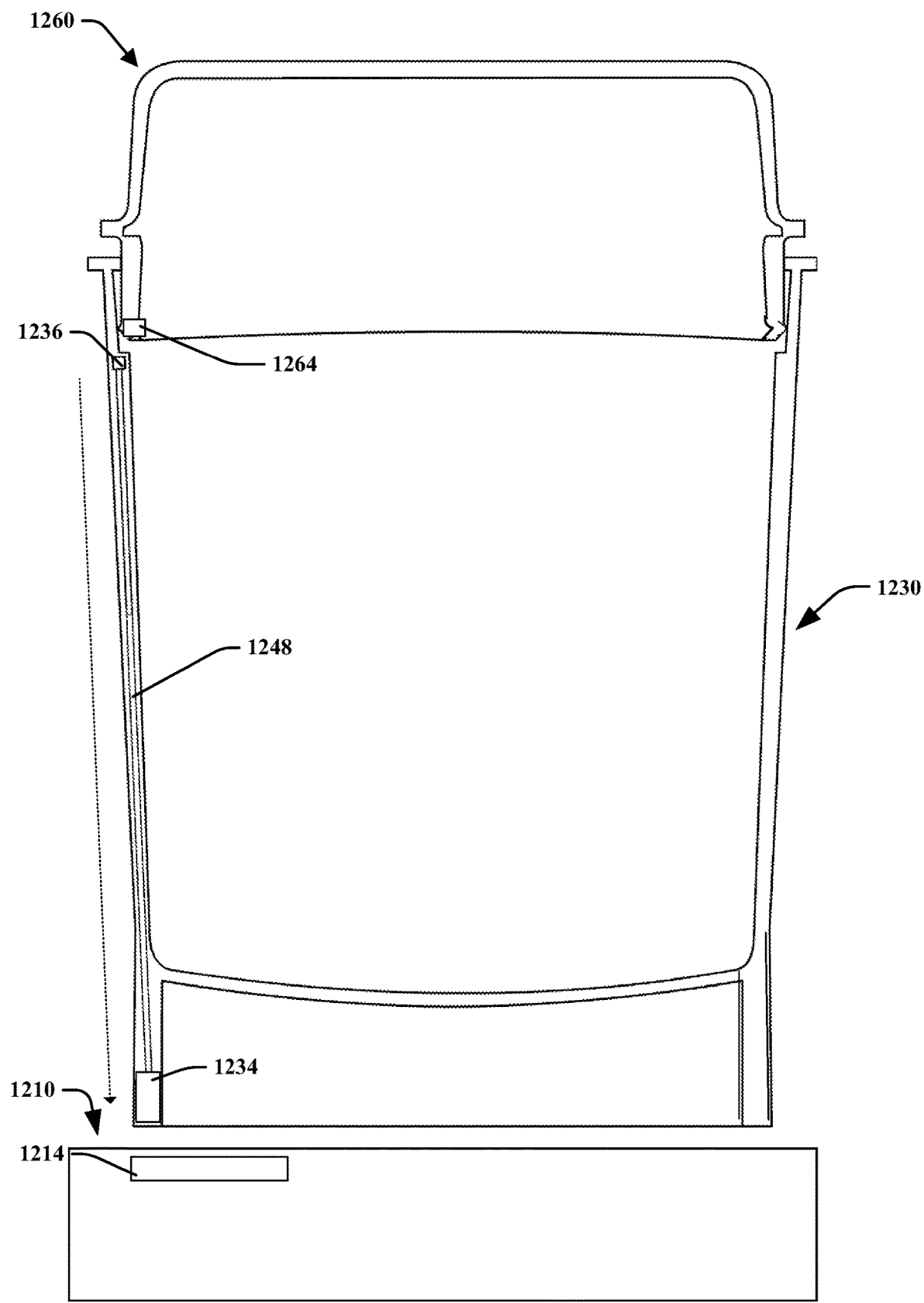
FIG. 12 is front view of a blending system including one or more NFC components arranged in series in accordance with various disclosed aspects.

In various examples, the base 20 may include a reed switch that operatively detects or is actuated by a magnet disposed in or on in the enclosure 40, such as in or on the body portion 41, the base 44, or in a cover portion, such as cover 1716 shown in FIG. 12. This may allow the base 20 to determine whether the enclosure 40 is operatively coupled to the base 20, or whether the cover 1716 is operatively in a closed orientation.

In at least one example, the base 20 may comprise two or more reed switches, where a first reed switch determines whether the enclosure 40 is operatively attached to the base 20. For instance, the reed switch may be actuated by a magnet in the base 44 or body portion 41 when the enclosure 40 is secured to the base 20. The base 20 may include a second reed switch, which determines whether the enclosure 40 is in a closed orientation. For instance, the reed switch may be actuated by a magnet in the cover when the enclosure 40 is secured to the base 20 and when the cover is in a closed orientation. As described here and elsewhere in this disclosure, the base 20 may permit driving of the motor when magnets activate reed switches (or other sensors), and may prohibit driving of the motor when at least one magnet does not actuate a reed switch.

It is noted that the embodiments may include other or different sensors to determine whether the enclosure 40 is operatively attached to the base 20 or the enclosure in a closed orientation. As one example, the base 44 or body portion 41 may include a reed switch that is actuated by a magnet in the cover when the cover is in a closed position. The reed switch may, for example, close a circuit to allow an NFC device within the cover to communicate with an NFC device within the base. In other examples, the system 10 may only determine that the cover is in a closed position. If the base 20 determines that the cover is in a closed position, then it may be assumed that the enclosure 40 is in an operatively closed position. Likewise, if the base 20 cannot, or does not, determine that the cover is in a closed position, then it may be assumed that the cover is either in an open position or that the enclosure 40 is not operatively coupled to the base 20.

In another aspect, NFC sensors or other wireless sensors may be utilized to determine whether the enclosure 40 is operatively attached to the base 20, whether the enclosure 40 is in an open condition or a closed condition, whether the container is operatively attached to the base 20, whether the lid is attached to the container, or the like.

Figure 4A:
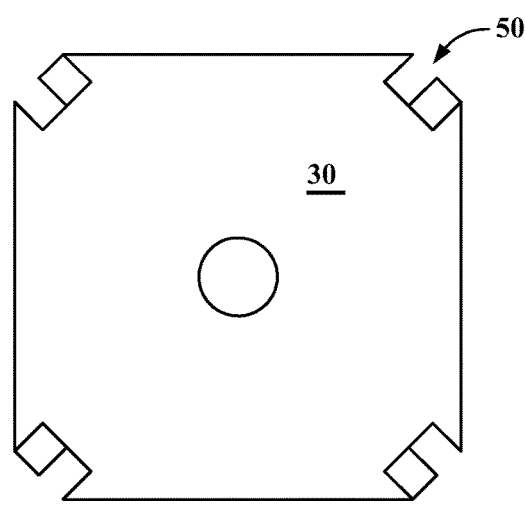
FIGS. 4A and 4B are, respectively, schematic plan views of another embodiment of the pedestal and a base of the enclosure in accordance with various disclosed aspects.
Figure 4B:
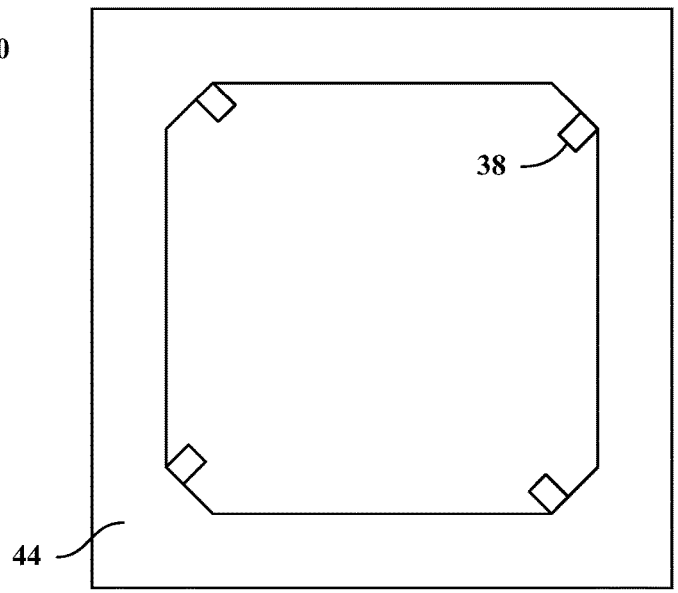

In another embodiment as illustrated by FIGS. 4A and 4B, the engagement members 38 may be positioned along the aperture 46 of the base 44, and the engagement channels 50 may be positioned along the pedestal 30. This rearrangement of members relative to each other may also include various orientations, wherein the pedestal 30 may include both engagement members 38 and engagement channels 50, and the base 44 may include both engagement members 38 and engagement channels 50. These staggered orientations may also allow for the alignment of the engagement members to the engagement channels to achieve pivotal connection between the enclosure 40 and the base 20.

FIG. 5 illustrates an exemplary blending system 510 in accordance with various disclosed embodiments. System 510 may utilize various disclosed aspects. For instance, system 510 may include an enclosure 40 as described with reference to FIGS. 1-4.

System 510 primarily includes a blender base 502, a container 520 operatively attachable to the blender base 502, a blade assembly 530 (which may include a bifurcated seal), and a lid 540 that may be operatively attached to the container. The container 520 may include walls 524 and a handle 522. Foodstuff may be added to the container 520 for blending. It is noted that the container 520 may comprise various materials such as plastics, glass, metals, or the like. In another aspect, the container 520 may be powered in any appropriate manner.

The blade assembly 530, container 520, and base 502 may removably or irremovably attach. The container 520 may be powered in any appropriate manner, such as disclosed in U.S. patent application Ser. No. 14/213,557, entitled Powered Blending Container, which is hereby incorporated by reference. While shown as a large-format system, the system 510 may comprise a single serving style system, where the container is filled, a blender base is attached to the container, and then the container is inverted and placed on a base.

The base 502 includes a motor disposed within a housing. The motor selectively drives the blade assembly 530 (e.g., cutting blades, chopping blades, whipping blades, spiralizing blades, etc.). The blade assembly 530 may agitate, impart heat, or otherwise interact with contents within the container. Operation of the blender system 510 may impart heat into the contents within the container 520.

In at least one embodiment, the blending system 510 may identify or detect whether the system 510 is interlocked through interlock components, such as proximity sensors which may include mechanical detection (e.g., push rods), user input, image recognition, magnetic detection (e.g., reed switches), electronic detection (e.g., inductive coils, a near field communication (NFC) component), or the like. Further, the system 510 may identify or detect whether the enclosure 40 is interlocked to the pedestal 30 through interlock components such as mechanical detection (e.g., push rods), user input, image recognition, magnetic detection (e.g., reed switches), electronic detection (e.g., inductive coils, a near field communication (NFC) component), or the like.

It is noted that the blending system 510 may be interlocked in different arrangements or states. For instance, the base 502 may be interlocked with the container 520. The container 520 may be interlocked with the lid 540. In another aspect, the enclosure (e.g., enclosure 40) may be interlocked with the base 502. In at least one example, the system 510 may utilize a control circuit to operatively allow the motor to rotate a splined coupler in response to determining that the blending system 510 is in a first arrangement or a second arrangement. The first arrangement may include the enclosure interlocked or operatively attached to the base 502, with the cover in a closed position. The enclosure, thus, prevents a user from contacting the splined coupler or a blade assembly 530. In an aspect, the first arrangement may further comprise the container 520 as being operatively attached to the base 502. The first arrangement may be independent of (e.g., does not depend on) whether or not the lid is operatively attached to the container, such that the control circuit operatively allows the motor to rotate a splined coupler when the blender system 510 is in a first arrangement regardless of whether the lid 540 is operatively attached to the container. As described herein, the enclosure in a closed state will prevent a user from contacting the splined coupler or the blade assembly 530. It is noted, however, that some embodiments may require the lid 540 to also be operatively attached to the container 520 to prevent spillage within the enclosure.

In a second arrangement, the enclosure is not operatively attached to the base 502, and the container 520 and lid 540 are operatively attached to the base 502. It is noted that an arrangement without the enclosure would allow access to the container 520. Thus, the system 510 may require the lid 540 and base 520 to be operatively attached to the base 502 to operate the motor such that the user cannot contact the splined coupler or the blade assembly 530 when rotating.

It is further noted that other arrangements may be utilized. For instance, embodiments may allow for some or all blending programs to be executed when the enclosure is attached to the base 502 and is in an open state, as long as the container 520 and/or lid 540 are operatively attached to the blender base. In an example, the blending system 510 may allow for blending via a "pulse" button or for certain programs when the enclosure is in an open state.

The system 510 and processes described herein generally relate to blending or food-processing systems that include a food-processing disc comprising one or more inductive coils. In another aspect, one or more of the disc and/or lid may comprise an NFC component that may interact with an NFC component of a blender base. The NFC component of the blender base may receive information regarding the type of the disc and may utilize the blender base may utilize the information to determine a blending process to be utilized by the system.

It is noted that the various embodiments described herein may include other components and/or functionality. It is further noted that while described embodiments refer to a blender or a blender system, various other systems may be utilized in view of the described embodiments. For example, embodiments may be utilized in food processor systems, mixing systems, hand-held blender systems, various other food preparation systems, and the like. As such, references to a blender, blender system, and the like, are understood to include food processor systems, and other mixing systems. Such systems generally include a blender base that may include a motor, a blade assembly, and a controller. Further, such systems may include a container, a display, a memory or a processor.

As used herein, the phrases "blending process," "blending program," and the like are used interchangeably unless context suggest otherwise or warrants a particular distinction among such terms. A blending process may comprise a series or sequence of blender settings and operations to be carried out by the system 510. In an aspect, a blending process may comprise at least one motor speed and at least one time interval for the given motor speed. For example, a blending process may comprise a series of blender motor speeds to operate the blender blade at the given speed, a series of time intervals corresponding to the given motor speeds, and other blender parameters and timing settings. The blending process may further include a ramp up speed that defines the amount of time the motor takes to reach its predetermined motor speed. The blending process may be stored on a memory and recalled by or communicated to the blending device.

Further details on certain aspects may be found in U.S. Pat. No. RE45,655, filed on May 14, 2013 and granted on Aug. 18, 2015, and/or U.S. patent application Ser. No. 14/659,094, filed on Mar. 16, 2015.

Figure 6A:
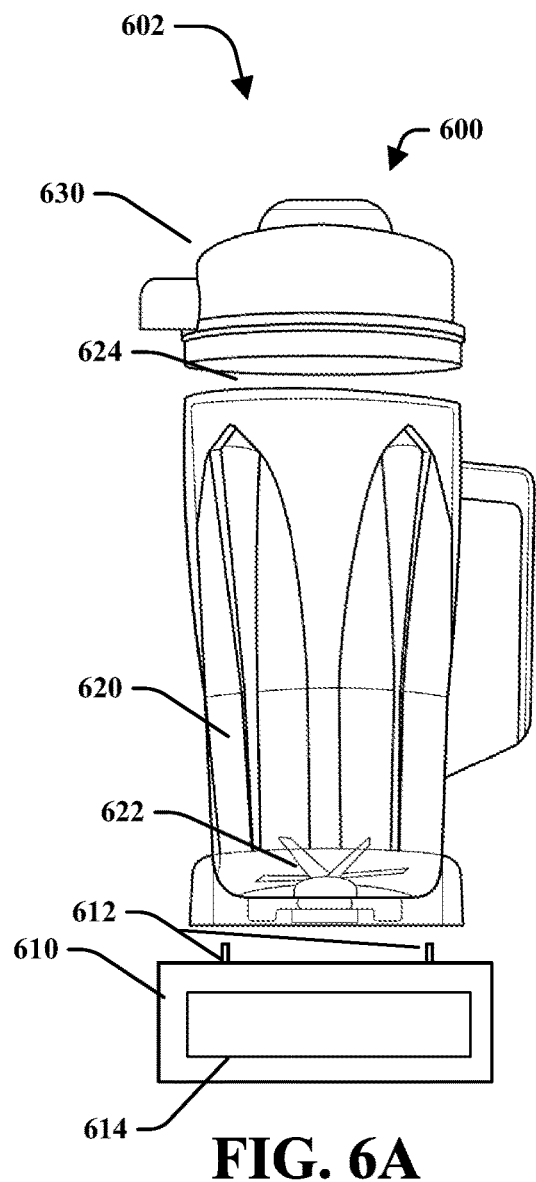
FIG. 6A is a front view of an embodiment of a blender system in a non-interlocked state in accordance with the present disclosure.
Figure 6B:
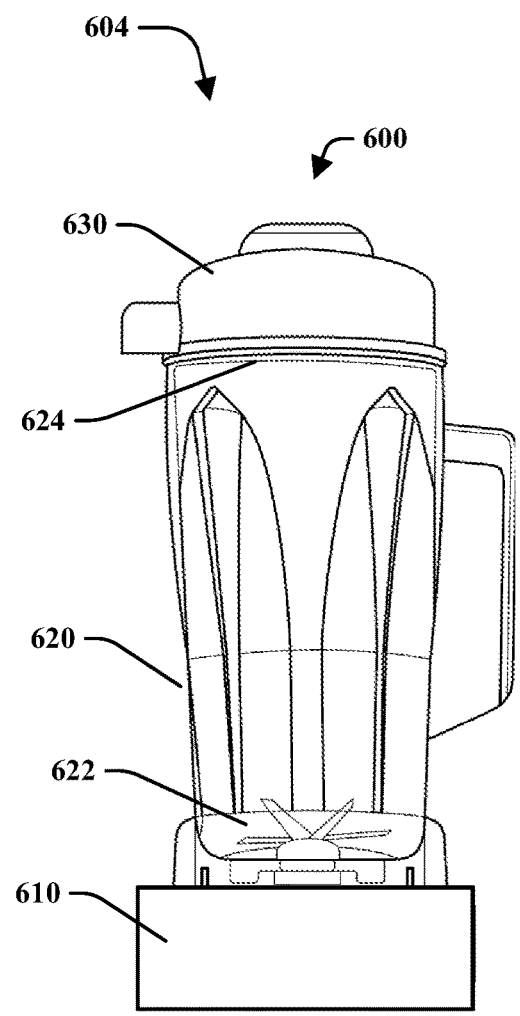
FIG. 6B is a front view of the blender system of FIG. 1A in an interlocked state in accordance with the present disclosure.

Referring now to FIGS. 6A and 6B, there depicted is a front view of a blending system 600 in a non-interlocked state 602 and an interlocked state 604. The blending system 600 may primarily include a base 610, a container 620, and a lid 630. The base 610 may be any appropriate size and configuration. The base 610 may house and generally protect the operative components of the blending system 600, such as a motor, fan, controllers, circuitry, human interfaces (e.g., touch screen, LED or LCD displays, lights, buttons, knobs, dials, or other actuators), and the like. As illustrated, the base 610 may include a control panel 614 positioned on a face of the base 610 such that a user may interact with the control panel 614. The control panel 614 may be of any appropriate configuration and may allow a user to set the operative condition of the blending system 600. It will be appreciated that the control panel 614 may include one or more human interfaces.

Container 620 may include and/or be coupled with an agitator or blade assembly 622. The blade assembly 622 may be of appropriate configurations and may operatively rotate within the container 620 (e.g., via a motor). For instance, a user may place foodstuff in the container 620 to allow the blade assembly 622 to chop, mix, blend, or otherwise interact with the foodstuff.

In an interlocked state 604, the container 620, base 610, and lid 630 may be interconnected in an appropriate manner. For instance, the lid 630 may be attached or coupled to the open end 624 of a container 620. According to an embodiment, the lid 630 may be press-fit (e.g., friction fit) within or about the open end 624, twisted (e.g., via threaded members), latched, or otherwise connected with the open end 624. It is noted that lid 630 and container 620 may be coupled via various other means, including magnetic means, VELCRO, mechanical fasteners, or the like.

Furthermore, the container 620 may be attached to or otherwise operatively engaged with the base 610. In at least one embodiment, the base 610 may include protrusions 612 that guide the alignment of the container 620. It is noted that the container 620 may be attached to the base by threaded members, fasteners, press-fit geometries, magnetic means, or the like. In at least one embodiment, the weight of container 620 may provide sufficient force to maintain a connection between the base 610 and container 620.

The blade assembly 622 may include a splined shaft that operatively engages with a splined coupling of the base 610. For instance, when the container 620 is operatively placed on the base 610, the splined coupling receives the splined shaft, which depends downwardly from the bottom of the container 620. A motor may drive the splined coupling that, in turn, drives the splined shaft. Driving of the splined shaft causes rotation of the blade assembly 622 within the container 620.

In the non-interlocked state 602, the container 620 is not operatively connected to at least one of the lid 630 or base 610. It is noted that FIG. 6A depicts the container 620 as not operatively connected to both the lid 630 and base 610. According to embodiments, the blending system 600 may prevent or prohibit operation of the motor when in the non-interlocked state 602 and may allow or enable operation of the motor when in the interlocked state 604. Alternatively or additionally, when in the interlocked state 604, the blade assembly 622 may be prevented from rotating.

Embodiments will be described herein with reference to FIGS. 6A and 6B. It is noted that the configurations of the base 610, container 620, and lid 630 are provided for reference and example. As such, various other configurations are within the scope and spirit of this disclosure. In an example, an enclosure may be utilized with the base 610, such as disclosed with reference to FIGS. 1A-5 and 17.

Figure 7:
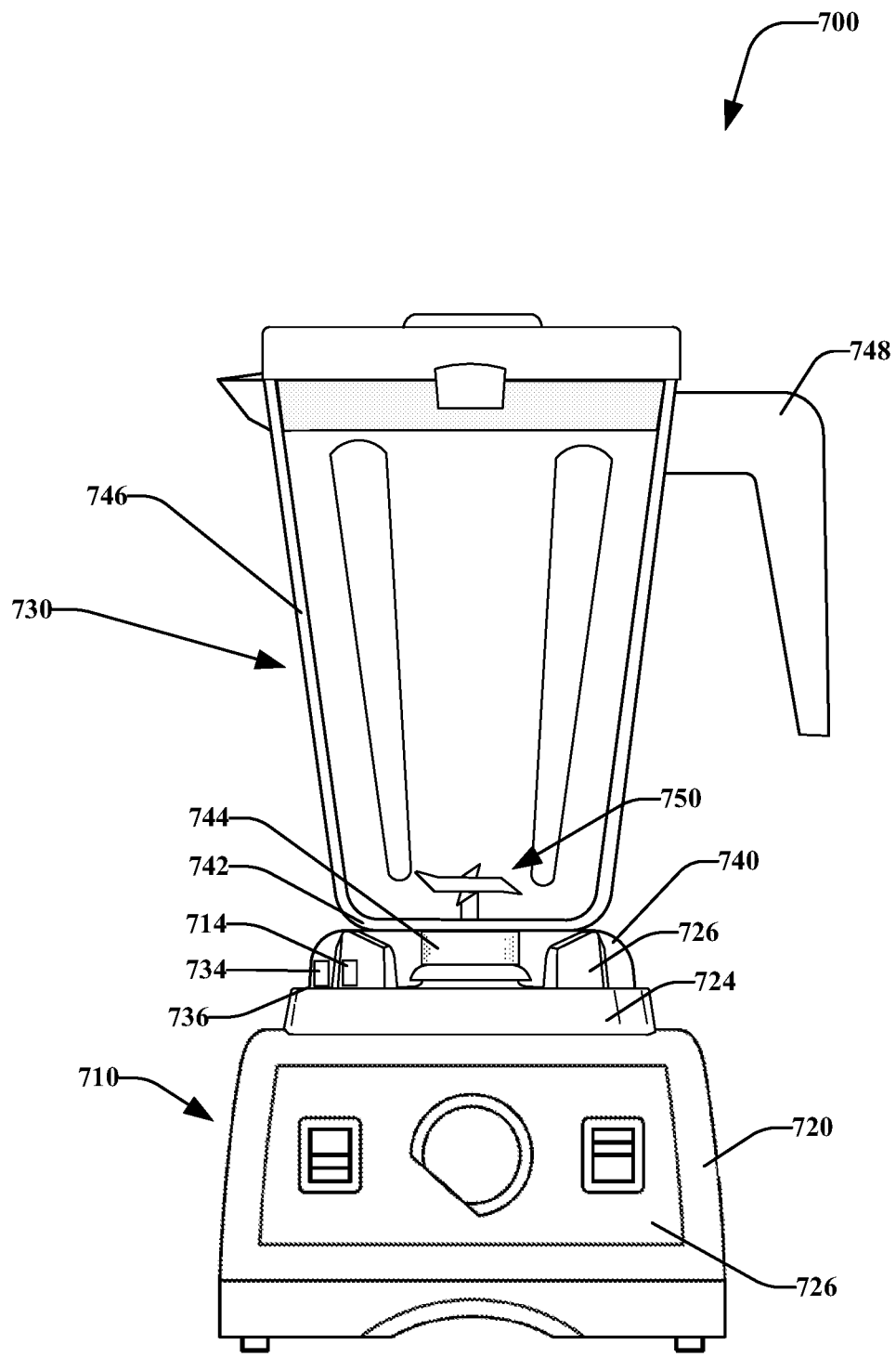
FIG. 7 is a front view of a blending system including a container comprising an NFC component in accordance with various disclosed aspects.

Turning to FIG. 7, there is a front view of a blender system 700 that may comprise an NFC interlocking mechanism in accordance with various disclosed aspects. The blender system 700 may include a blender base 710 and a container 730. The blender base 710 and the container 730 may comprise NFC component 714 and NFC component 734, respectively. As described herein, NFC components 714/734 may comprise transceivers, receivers, memory devices, a processor or the like.

The container 730 and blender base 710 may each include one or more NFC components. For instance, the blender base 710 may include k NFC components and the container 730 may include i NFC components, where k and i are numbers. While embodiments may refer to one or more NFC components for brevity, it is noted that the container 730 may comprise i and the blender base 710 may comprise k NFC transmitters and/or receivers that are coupled to an NFC component. Moreover, an NFC component may comprise one or more silicon wafers, printed circuit boards, flexible circuit boards, or the like.

In at least one embodiment, the NFC component 714 may be disposed at various locations of the blender base 710. For instance, the blender base 710 may include a body 720, an attachment member 724 (e.g., pedestal, attachment pad, etc.) that may include one or more protrusions 726, and a control panel 728. The NFC component 714 may be disposed in one or more of the body 720, attachment member 724, and/or control panel 728. It is noted that that NFC component 714 may be disposed in a position that may be proximal to the NFC component 734 when the container 730 is operatively coupled with the blender base 710. It is further noted that NFC components 714 and 734 may comprise antennas that may span a distance to allow for multiple interlocked positions. For example, the NFC component 734 may comprise a loop antenna that generally circumvents a blade assembly and the NFC component 714 may comprise a loop antenna that generally circumvents a coupler and/or attachment member 724.

The NFC component 734 may be disposed at various locations, such as at the apron 740, closed end 742, retainer nut 744, wall 746, and/or within the blade assembly 750. It is noted that the NFC component 734 may be disposed in other locations such as a handle 748 or the like. In another aspect, the NFC component 714 may be disposed within the blender base 720 at a location selected such that the NFC component 714 and NFC component 734 may communicate. For instance, one or more protrusions 726 may comprise one or more NFC components 714, and the container 730 may comprise one or more NFC components 734 in the apron 740, such that the NFC components 714 and 734 may be proximal to each other when the container 730 is operatively coupled to the blender base 710. In an aspect, at least two protrusions 726 may each comprise an NFC component 714 and the container 730 may comprise at least two NFC components 734. This may ensure that the container 730 is properly attached to the blender base 710 such that each of the NFC components 714 can detect an NFC component 734 of the container 730. Detecting multiple NFC components 734 may allow the container 730 to be attached to the blender base 710 in various operable positions. In another aspect, the blender base 710 may utilize multiple NFC components to detect an enclosure, a cover of an enclosure, a lid, or the like. As such, the blender base 710 may identify different arrangements or orientations and may allow control operation of a motor based on the arrangement (e.g., prohibit or allow driving of the motor, prohibit or allow particular blending programs or operations, etc.).

It is noted that the NFC component may be disposed in a separate device that is operatively attachable to the container 730, base 710, and/or other portions of blender system 700. By way of a non-limiting example, the NFC component 734 may be disposed in a disc that is selectively engageable with the retaining nut 744. In these embodiments, the disc may be selectively attached to the retaining nut 744 (or any other appropriate portion of the container 730) and may communicate as described herein with the NFC component 714. This may allow an existing container to be retrofitted with the NFC component 734 to communicate with the base 710. In examples, the NFC component(s) 714/734 may be embedded within a material, adhered to a material, sealed on a surface, disposed on a surface, may be removable, or the like. For example, the disc may be molded into the retaining nut 744 or a portion thereof. In embodiments, sealing may include providing a protective barrier to isolate the NFC component 714/734 from an external atmosphere or environment, including, without sealing the NFC component 714/734 such that it is capable of withstanding a dishwasher. For instance, exposure may allow for damage from fluid, foodstuff, or other contaminants that may corrode or otherwise harm the NFC component(s) 714/734.

According to embodiments, at least one of the NFC components 734 may be disposed near the closed or proximal end 736 of the container 730. For instance, the NFC component 734 may be disposed within or proximal to the apron 740 of the container 730. As shown in FIG. 7, the NFC component 714 may be proximal to the NFC component 734 when the container 730 is interlocked with the blender base 710. The sensitivities and/or communication ranges of the NFC component 714 and the NFC component 734 may be selected such that NFC components 714 and 734 will communicate (e.g., are within range of each other) when the container 730 and blender base 710 are operatively interlocked as shown in FIG. 6B, and will not communicate (e.g., are outside the range of each other) when the container 730 and blender base 710 are not interlocked, as shown in FIG. 6A.

The NFC component 714 may receive power from a power source (e.g., power mains, battery, etc.) coupled to the blender base 710. For instance, the NFC component 714 may receive power when the blender base 710 is plugged into an outlet and/or switched on. The NFC component 714 may transmit a signal that may operatively excite or power the NFC component 734. It is noted that the signal may be configured to excite the NFC component 734 only when the NFC component 734 is within a determined distance, such as when the container 730 is operatively interlocked with the blender base 710. For instance, a transmitter of the NFC component 714 may provide a signal at a given frequency, wherein the signal may be received by a receiver of the NFC component 734. Excitement of the NFC component 734 may elicit a response from the NFC component 734 and the NFC component 714 may receive the response. When the NFC component 714 receives the response, it may allow for operation of a motor. If no response is received and/or a weak response is received, the container NFC component 714 may prevent or prohibit operation of the motor. It is noted that the NFC component 734 may comprise its own power source and/or may receive power from a disparate source.

Figure 16:
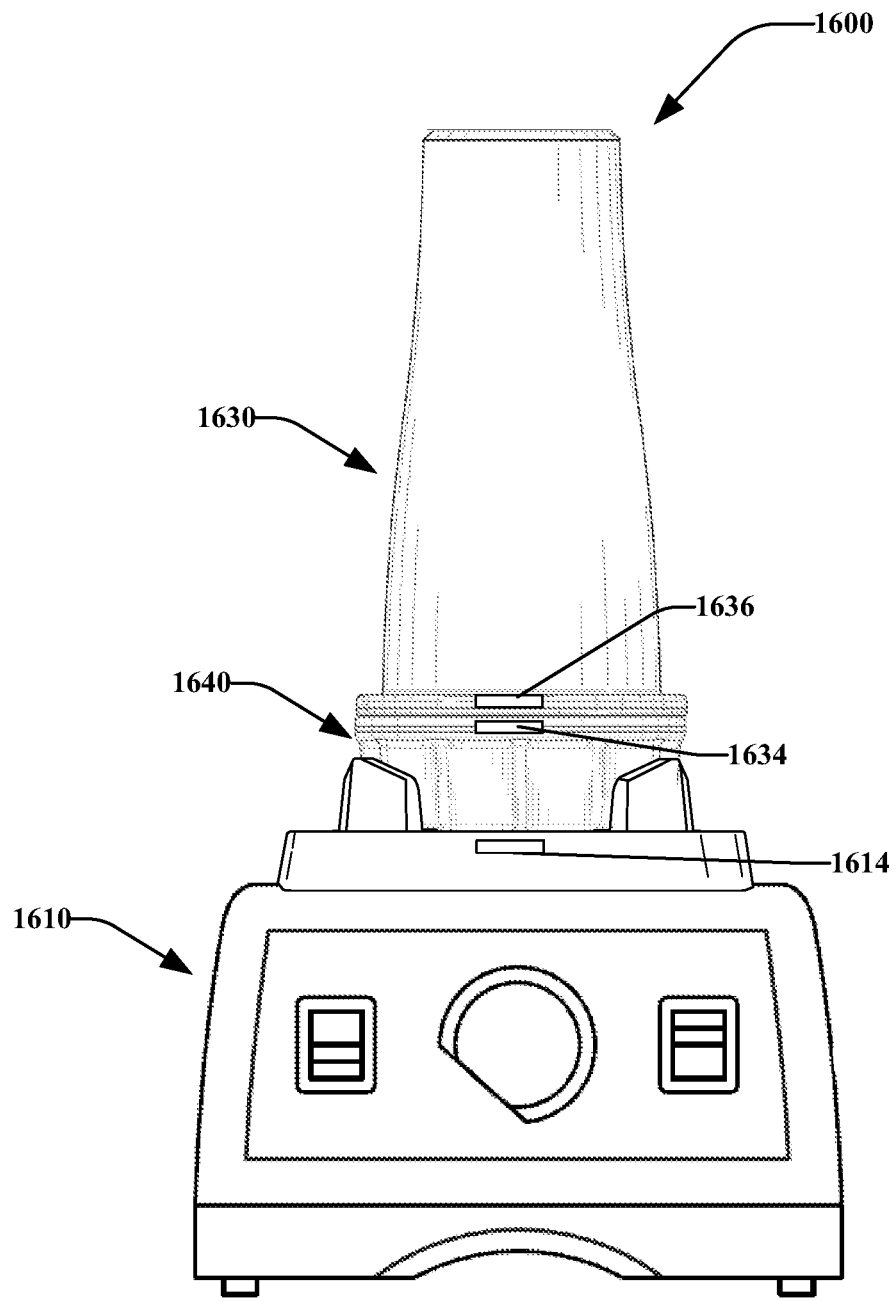
FIG. 16 is front view of a blending system including a single serving container comprising a NFC component in accordance with various disclosed aspects.

Moreover, while FIG. 7 describes a pitcher-style container and blade assembly, it is noted that other containers may be utilized in accordance with the disclosed aspects. For instance, with reference to FIG. 16, there is a blending system 1600 that may include a base 710, which may operatively receive a single serving container 1630 that may be operatively attached with a blade base 1640. The blade base 1640 may comprise at least one NFC component 1634, and the container 1630 may comprise an NFC component 1636. It is further noted that the base 710 may comprise an NFC component 1614 disposed in a position that allows it to communicate with at least one of NFC components 1634, or 1136. In at least one embodiment, the NFC component(s) 1634 and/or 1636 may be replaced with a switch and actuator (e.g., reed switch and magnet). Moreover, the system 1600 may or may not include the NFC component(s) 1634 and/or 1636. It is noted that a "single serving" container does not indicate a limited use for the container, but rather refers to a differently configured container that may be attached to a blade base. Such containers may have a closed end that is generally distal from a blender base when the container, blade base, and blender base are interlocked.

Figure 8:
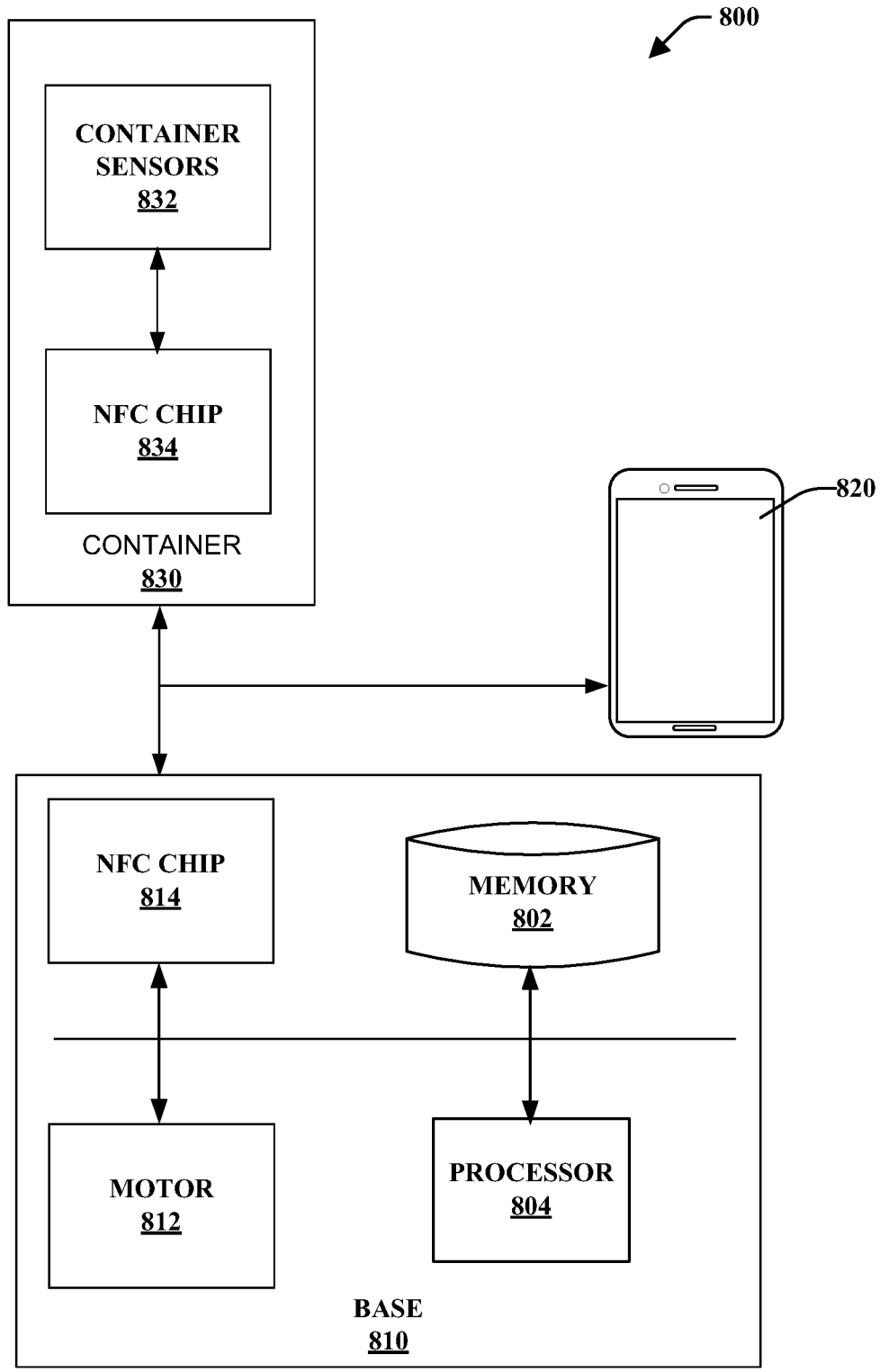
FIG. 8 is a function block diagram of a blending system including one or more sensors disposed within a container in accordance with various disclosed aspects.

Referring now to FIG. 8, with reference to the other disclosed figures, there is a functional block diagram of a blender system 800. It is noted that like-named components of systems 800 and 700 may comprise similar aspects and/or functionality. For instance, the base 710 and base 810 may comprise similar aspects and/or may comprise the same base. It is further noted that the system 800 may comprise other or additional components, such as a second container.

The base 810 may comprise a memory 802, a processor 804, an NFC component 814 and a motor 812. The motor 812 may operatively drive a blade assembly (e.g., blade assembly 750). The memory 802 may store computer executable instructions. The processor 804 may facilitate execution of the computer executable instructions. According to embodiments, the memory 802 may store blender processes or programs. For example, a user may select a desired blending program via a control panel 726, such as a "soup" program. The memory 802 may store the blending program, which may comprise blender settings and operations to be carried out by the motor 812 to make a soup. The processor 804 may receive the blending program from memory 802 and may generate instructions for the motor 812 and/or other components (e.g., a display—not shown) based on the blending program. It is noted that the memory 802 may store any number of blending programs, including user-defined programs.

According to one or more embodiments, the base 810 may include NFC component 814 that may communicate with NFC components of one or more other devices. For instance, NFC component 814 may communicate with the NFC component 834 of the container 830, an NFC component of a user device 820, or the like. When NFC component 834 is within a predefined range (e.g., distance) from NFC component 814, the base 810 and container 830 may communicate. As described herein, the NFC component 834 may be configured such that it is within an operable range when the container 830 and base 810 are interlocked, and it is outside the operable range when the container 830 and the base 810 are not interlocked. When in the operable range, the NFC component 814 may power NFC component 834 to elicit a response, such as to indicate whether the system is interlocked or to request data.

In at least one embodiment, NFC component 834 may comprise a memory device that may store blending program (s) and/or instructions associated with blending programs (e.g., instructions modifying blending programs). These blending programs may be specific to container 830. For example, a single serving container may be associated with different blending programs than a full sized container (e.g., container 730, pitcher-type container). Identification of the container may ensure that system 800 does not run blending programs designed for a full sized container when using a single serving container and vice versa. In another aspect, when a user interlocks a container 830 with the base 810, the NFC component 834 may provide the program to the NFC component 814. In an aspect, the processor 804 may facilitate storage of the program in memory 802 and/or may instruct the motor 812 to execute the program directly from the received instructions/program (e.g., without storing the program in memory 802). It is noted that the NFC chip 834 may store information that identifies compatible programs without storing the program itself. Such programs may be stored within the base 810, and base 810 may enable/disable the availability of programs based on information received from the NFC chip 834.

In an example, the base 810 may be configured to interact with a certain make/model of a container 830. For instance, at some point after a user initially acquires blender system 800, a new blade or container shape may be created. A user may purchase the new blade/container for use with the base 810. The new blade/container may be designed for specific blending programs, which may be different from blending programs stored by the base 810. For instance, the new blade/container may allow for completion of a blending process in less time than previous blending programs. Once purchased, the user may place the new container on the base 810 and the new container (e.g., via an NFC component)

may provide one or more programs and/or sets of instructions to the base 810. The base 810 (e.g., via processor 804) may alter previous blending programs, add new blending programs, or otherwise update stored blending programs based on the new instructions/blending programs. It is noted that the base 810 may update the blending programs upon detecting the container 830 and/or in response to user instructions. For example, the base 810 may automatically update programs (e.g., without user intervention) or may update the programs when a user instructs the base 810 to do so. Further, the new container may include a new and/or different blade assembly from the previous version used with the base 810. The new container (e.g., via an NFC component) may provide one or more programs and/or sets of instructions to the base 810 based upon the blade assembly being utilized.

According to another aspect, the base 810 may identify a container 830. Identifying a container 830 may include identifying a make, model, a particular container (e.g., via a unique identifier), blade assembly utilized in the container, or the like. In an example, identifying the container may include determining a match between received data and data stored in memory 802. For example, a set of identifiers may be stored in a table or other data structure in the memory 802. The NFC component 814 may receive an identifier from NFC component 834 and/or decode data received therefrom to determine an identifier. The identifier may then be compared to stored identifiers. It is noted that blender base 814 may communicate with user device 820 to access a communication network (e.g., a cloud) and/or components of the user device 820. For instance, the user device 820 may store container IDs.

In embodiments, a container ID may be associated with a container profile. The container profile may include characteristics or parameters of a blending container. For instance, the container profile may include information such as make and model of the blending container, weight of the blending container (e.g., with and without a lid, attachments, and the like), compatible blender bases, size of the blending container (e.g., capacity, height, volume, etc.), interlock of the blending container, blades utilized with the container, color, name of the blending container, date purchased, date profile was created, and the like. The container profile may store a history of use associated with a blending container as described herein.

In another aspect, the base 810 (or another receiver device) may verify whether the container 830 is compatible with the base 810 based on information received from the NFC component 834. For instance, the NFC component 834 may store a list of blenders (e.g., makes, models, etc.) to which the container 830 is compatible, parameters of the container 830 (e.g., make/model), or the like. The base 810 (e.g., via processor 804) may receive the parameters and/or query the NFC component 834 to determine whether the container 830 is compatible with the base 810. If the container 830 is compatible with base 810, then the base 810 may allow operation of the motor 812. If the container 830 is not compatible with the base 810, then the base 810 may disable or prevent certain operations, such as activation of the motor 812 and/or the blade assembly. In at least one embodiment, the base 810 may determine whether a container 830 is properly attached, such as by determining a proximity of the container 830 and the base 810. Thus, a blender system may prevent spillage of contents, improper functioning of the blades, or the like.

In another aspect, the system 800 may prevent use of improper or undesirable container and base combinations. It is noted that identification of a container 830 may allow a base 810 to verify the container to prevent improper containers (e.g., counterfeit) from being utilized, determine whether processes are compatible with a container, or the like. For example, if an authorized or improper container is detected by the base 810, the motor 812 may be prevented from operating, which in turns prevents the blades from turning.

System 800 may track a history of use associated with container 830, or other component such as an enclosure. Traditional systems do not track use of a container. Some systems may track use of a blender base, but users may utilize different containers for a given blender base. Tracking the use of a blender base does not indicate the use of the containers as the containers may be interchanged with blender bases. In commercial kitchens, users typically utilize multiple containers for one or more blender bases. This allows the user to prevent cross contamination of ingredients from different blending processes and may allow the users to make multiple products quicker than they could with only one container per blender base. Disclosed embodiments may track the use of each container and/or use of each blender base. For instance, NFC component 834 may store information associated with run time, cycles used, last date/time of use, types of programs run, or the like. The NFC component 834 may monitor the use and facilitate storage of the use via a memory device. In an example, when the NFC component 834 is powered, it may keep track and store on-time or run-time as a flag can be set when the motor 812 is running. It is noted that base 810, user device 820, or another device (e.g., an enclosure) may additionally or alternatively store use information associated with the containers.

In another example, the blender base 830 (e.g., via processor 804) may provide instructions to the NFC component 834 to facilitate updating (e.g., replacing) the historical use data. For instance, the blender base 830 may transmit, via NFC component 814, instructions or data that may cause NFC component 834 to update historical data stored on the container upon occurrence of a triggering event. A triggering event may include the end of each blending process, at intervals during a blending process, prior to container 830 being removed, when container is placed on the base 810, or upon user action (e.g., user manually changes a blending process, etc.).

In at least one described embodiment, user device 820 may receive usage data associate with container 830. The usage data may be received via NFC communication, such as from container 830 and/or base 810. In some embodiments, the base 810 may communicate with user device 820 via other wireless or wired communication mechanisms (e.g., Wi-Fi, hard-wired, BLUETOOTH™, etc.). For instance, base 810 may send container usage data to user device 820. In an example, user device 820 may be a tablet, computer, or other device of a commercial kitchen (e.g., restaurant, café, bistro, etc.). A worker of the commercial kitchen may receive the usage statistics and may select a container having less use compared to other containers. This may allow the commercial kitchen to prevent or manage overuse of a certain container. In another aspect, it may allow the users to determine when to replace a container. In another example, base 810 may monitor employee use of an enclosure to ensure employees are operating the system 800 while the enclosure is in a closed state. This may ensure employees are minimizing sound in commercial environments and/or following safety procedures.

As described herein, user device 820 may communicate with base 810 and/or container 830. For instance, user device 820 may comprise an NFC component disposed therein. A user may tap (e.g., place within a coverage area) the user device 820 with container 830 and/or base 810. As an example, the NFC component of the user device 820 may communicate with the container 830 and may receive usage data, container parameters (e.g., type, make, model, etc.), or other appropriate data. As an illustrative example, a user may wish to order a replacement container or a replacement part for a container, such as a replacement tamper. Traditionally, the user would have to know a make/model of the container to order the replacement. Here, the user device 820 may communicate with the container 830 and the user device 820 may automatically direct a user to a website or provide instructions that enable the user to order replacement parts. Thus, the user need not know the make/model of the container.

In another aspect, a user device 820 may update information stored by the container 830 and/or base 810. For instance, a user may download, create, or otherwise access a recipe via the user device 820. The user may utilize the user device 820 to instruct the container 830 and/or base 810 to update blender programs or identification information. As another example, the user may alter identification information associated with the container 830 and/or base 810. For instance, the user may identify a specific container 830 as containing, having contained, or having been utilized for nuts. When a user places the container 830 on the base 810, the base 810 may recognize the container 830 and display (e.g., via a screen, LED, etc.) information identifying the container as containing, having contained, or having been utilized for nuts.

Figure 9:
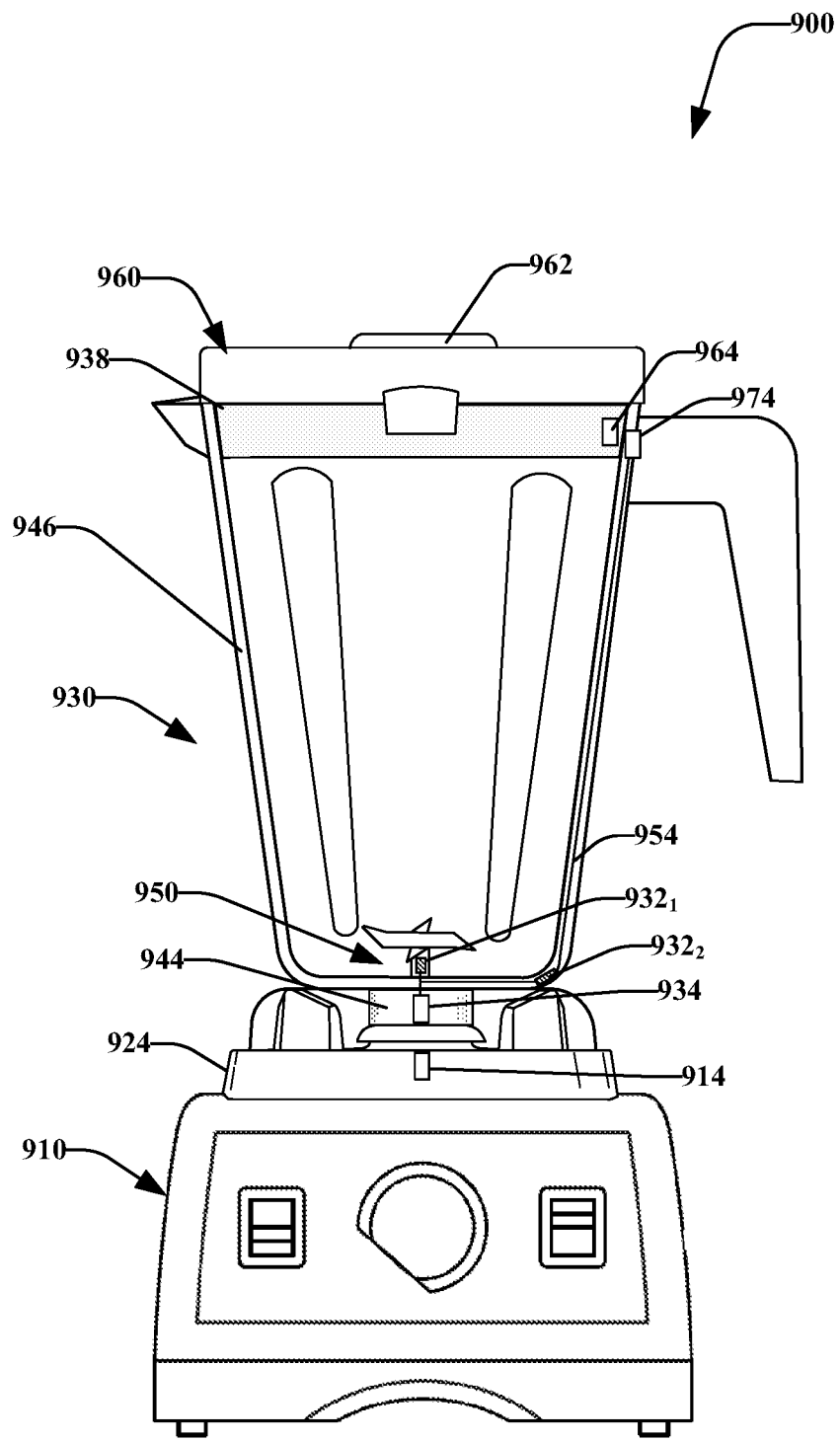
FIG. 9 is front view of a blending system including a lid comprising an NFC component in accordance with various disclosed aspects.

Turning to FIG. 9, with reference to the other figures, there is a blender system 900 that may include a container with an NFC component and one or more sensors. It is noted that like-named components of FIG. 9 and FIGS. 1-8 may comprise similar or identical aspects. For example, blender base 710 and blender base 910 may comprise the same or a similar blender base.

System 900 may include a blender base 910, container 930, and lid 960. As illustrated, a container 930 may include NFC component 934 that may be configured to communicate with NFC component 914 of blender base 910. In an aspect, NFC component 934 may be disposed within retainer nut 944 and NFC component 914 may be disposed within attachment member 924. NFC component 934 may be coupled with one or more sensors $932_1$-$932_2$. Sensors $932_1$-$932_2$ may be disposed within various portions of container 930. It is noted that any number of sensors may be utilized and/or comprised within various components. For instance, a first sensor $932_1$ may be disposed within blade assembly 950 and a second sensor $932_2$ may be disposed within a wall 946 of container 930. It is further noted that the sensors $932_1$-$932_2$ may be coupled to NFC component 934 via a wired connection, such as bus 954. In another aspect, the sensors $932_1$-$932_2$ may be coupled to the NFC component 934 (and/or NFC component 914) via a wireless connection. According to an example, the sensors $932_1$-$932_2$ may comprise NFC components that may be powered (e.g., directly or indirectly) by NFC component 914.

The sensors $932_1$-$932_2$ may include temperature sensors, motion sensors, audio sensors, or the like. NFC component 934 may receive data from the sensors $932_1$-$932_2$ and may transmit the sensor output to the blender base 910, such as via NFC component 914. In an example, one or more of the sensor(s) $932_1$-$932_2$ may measure the temperature of a mixture from inside the container 930. The temperature may be communicated to the NFC component 914. When then temperature reaches a desired threshold or temperature range, the blender base 910 may advance a blending program. For instance, a user may add ingredients for a soup recipe. The user may then select a soup setting (and/or a desired temperature). As the ingredients are blended and/or heated, the one or more sensors $932_1$-$932_2$ may measure the temperature within the container 930. When a desired temperature is reached, the blender base 910 may end the blending process.

In another example, the blender base 910 may utilize the temperature in the container in a feedback loop to control the speed, fluid shear and friction heating. This may be used to keep a mixture at a certain temperature. For example, in response to determining that a mixture exceeds a threshold or temperature limit (e.g., maximum, minimum, etc.), the blender base 910 may alter (e.g., reduce, increase, etc.) the speed of the blade assembly 950. The altered speed may result in altered friction heating to allow for temperature control of the mixture. It is noted that the blender base 910 may receive multiple temperature readings from different sensors. The blender base 910 may utilize the multiple readings to determine a temperature (e.g., average, etc.).

One or more of sensors $932_1$-$932_2$ may include motion sensors (e.g., gyroscopes, accelerometers, etc.), sound sensors, or the like. Such sensors $932_1$-$932_2$ may be utilized, for example, to determine the end of a blending program and/or a stage in a blending program. According to an embodiment, blender base 910 may determine to advance in a blending program when sensors $932_1$-$932_2$ reach a steady state indicating that a blending program may advance. For instance, during a blending process, a mixture within the container 930 may transition through several stages or states. These states may be associated with particular motions (or set of motions), sounds, or the like. In an example, a user may add ingredients to the container 930. When the user adds ingredients, the blade assembly 950 may chop or otherwise blend the ingredients. This may result in audio spikes, sudden changes in movement, or the like. In an example, a user making a soup may add a carrot into the container 930. The blade assembly 950 will produce a chopping noise and/or cause a sudden-chop motion. These noises and/or motions may be represented by a particular output of audio and/or motion sensors (e.g., spikes, peaks, dips, etc.). As the carrots are blended with other foodstuff, the output of the sensors $932_1$-$932_2$ will eventually normalize (e.g., reach a steady or semi-steady state). When the output normalizes, the blender base 910 may determine that that a blending program may advance.

Blender system 900 may include lid 960 that may be operatively coupled to an open end 938 of container 930. Lid 960 may include a cap 962 that may be removably attached thereto. For instance, a user may remove cap 962 to add ingredients to container 930 during a blending process. According to embodiments, lid 960 may include one or more NFC component(s) 964. The NFC component 964 may be configured to communicate with an NFC component of the container 930 and/or blender base 910. In an aspect, the NFC component 964 may communicate with an NFC component 974 disposed within the container 930. It is noted that NFC component 964 may include or otherwise communicate with sensors (e.g., temperature, motion, etc.) as described herein. As described herein, embodiments may utilize various devices or methods to determine whether lid 960 is operatively coupled to container 930, such as reed switches, magnets, or the like. As described herein, embodiments may control operation of a motor based on determining whether the lid 960, container 930, blender base 910, an enclosure, or other components are operatively attached and/or in a particular state (e.g., a closed state, open state, etc.).

In another aspect, when container 930, blender base 910 and lid 960 are operatively interlocked, the NFC component 914 may provide power to NFC component 934. The NFC component 934 may be coupled to NFC component 974, such as via bus 954, to provide power and/or otherwise communicate therewith. Likewise, NFC component 964 may receive power from NFC component 974. In at least one embodiment, the blender base 910 may determine whether the lid 960 is operatively coupled to the container 930. In response to determining that the lid is not interlocked with the container, the blender base 910 may disable or otherwise prevent operation of a motor (e.g., motor 812). Likewise, in response to determining that the lid is interlocked with the container, the blender base 910 may allow operation of the motor.

NFC component 964 may communicate directly with NFC component 914. For instance, NFC component 914 may be configured to power NFC component 964 when NFC component 964 is within a determined range. In an aspect, the range may be based on the height of container 930. Thus, when lid 960 is attached to container 930, and the container 930 is attached to base 910, NFC component 914 may detect NFC component 964 without the need for other NFC components (e.g., NFC component 934, 974, etc.).

In at least one embodiment, NFC component 914 may be configured to broadcast signals at various frequencies and/or to detect NFC components at various distances. For example, NFC component 914 may broadcast a signal to power NFC component 934. If NFC component 934 is detected (e.g., container 930 is interlocked with blender base 910), then NFC component 914 may broadcast a signal to power NFC component 964 (e.g., lid 960 is interlocked with the container 930). If the lid 960 is detected, then NFC component 914 may enter a monitoring process that monitors whether the lid 960 is removed and/or is no longer within the desired range. If the lid 960 is removed from the desired range, NFC component 914 will not be able to communicate with the lid 960 and system 900 may determine that the lid 960 is not interlocked with the container 930 and/or the container 930 is not interlocked with the blender base 910.

Figure 10:
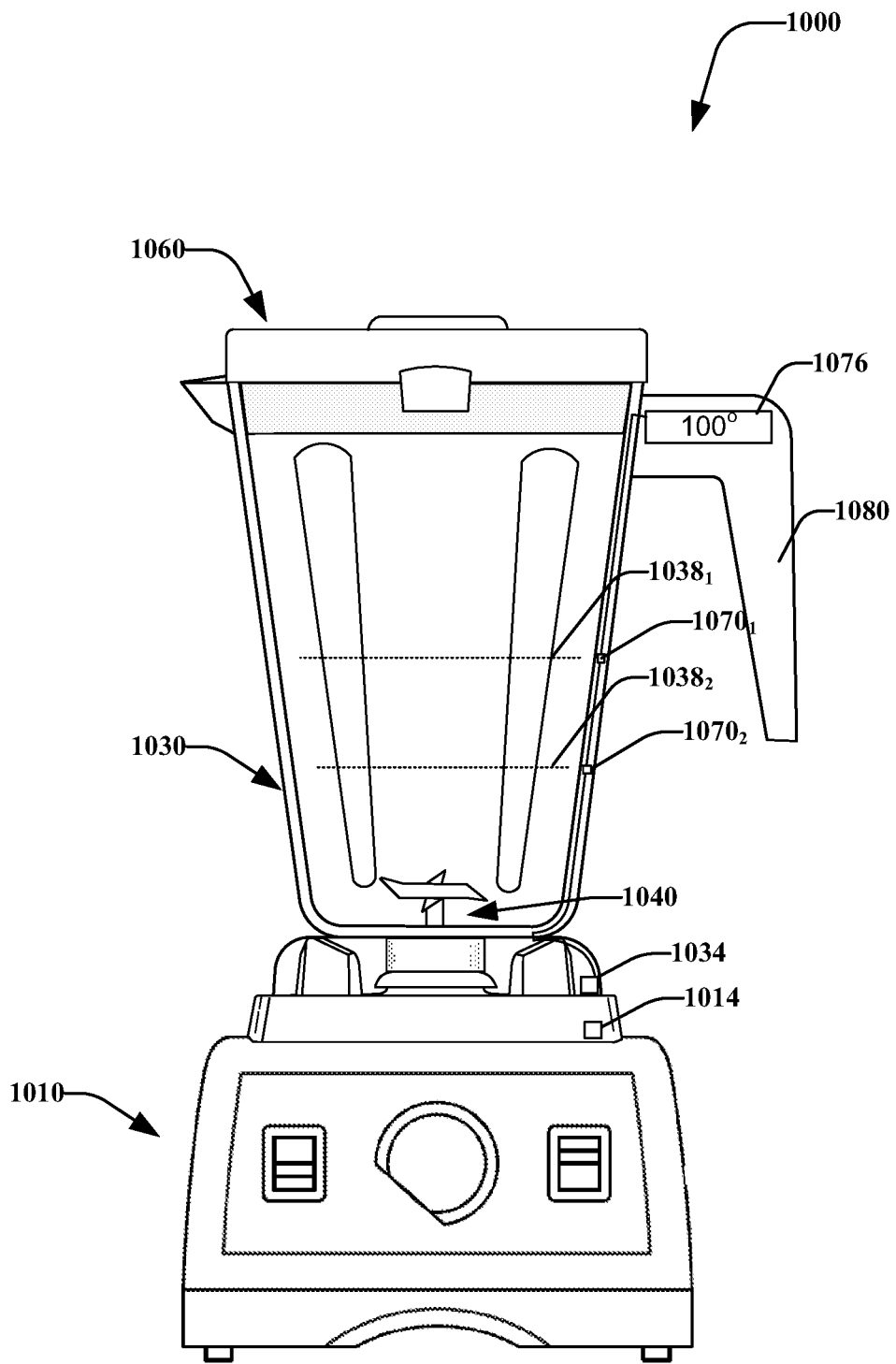
FIG. 10 is front view of a blending system including one or more visual display elements coupled to an NFC component in accordance with various disclosed aspects.

Turning to FIG. 10, there is a blender system 1000 comprising NFC communication capabilities, in accordance with various described aspects. It is noted that blender system 1000 may include all or some aspects as described with reference to FIGS. 7-8. Blender system 1000 may primarily include blender base 1010 (which may include NFC component 1014), container 1030 (which may include NFC component 1034), and lid 1060. In an aspect, blender base 1010, container 1030 and lid 1060 may be interlocked together.

Container 1030 may include indicia or gradient markers $1038_1$-$1038_2$. It is noted that container 1030 may include any number of gradient markers $1038_1$-$1038_2$. In an aspect, the gradient markers $1038_1$-$1038_2$ may represent measurements (e.g., volume) of contents within container 1030. Gradient markers $1038_1$-$1038_2$ may be etched, painted, molded, or otherwise formed on a surface of or within container 1030. In at least one embodiment, container 1030 may comprise visual display elements, such as light emitting diodes (LEDs) $1070_1$-$1070_2$ and display 1076. It is noted that other or different visual display elements may be utilized. It is also noted that other components of system 1000 (e.g., lid 1060, blender base 1010, etc.) and/or disparate devices (e.g., user device 820) may comprise display elements. While visual display elements are described, it is noted that other notification mechanisms (e.g., audio, tactile, etc.) may be utilized.

NFC component 1034 may control or power visual display elements, such as LEDs) $1070_1$-$1070_2$ and display 1076. The display elements may be disposed on a side of container 1030, within container 1030, on a handle 1080, or the like. As shown, LEDs $1070_1$-$1070_2$ may be disposed within a wall of container 1030. It is noted that LEDs $1070_1$-$1070_2$ may comprise one or multi-colored LEDs. In an example, a user may follow a recipe for a particular smoothie. As the user adds ingredients, the NFC component 1034 may activate and/or deactivate the LEDs $1070_1$-$1070_2$ to indicate the level at which ingredients should be added. In some embodiments, the blender system 1000 may utilize pressure sensors (e.g., weight sensors), motion sensors (e.g., level or height sensor), or the like to determine when a user adds foodstuff to the container 1060. Based on the sensors, the NFC component 1034 may activate an appropriate LED to indicate the level to which the user should fill the container with a particular ingredient.

In another aspect, NFC component 1034 may control a display 1076 that may be disposed on a handle 1080, an enclosure, or the like. The display 1076 may comprise a digital display that may display textual or image data. The display 1076 may display data associated with a blending process, such as a blending time (e.g., total time, time remaining, etc.), temperature, or the like. In another aspect, display 1076 may display information specific to the container 1030, such as a history of use (e.g., use cycles, run-time, etc.). It is noted that the NFC component 1034 may be configured to cause the display 1076 to render various other information. It is further noted that a display may be removably coupled to the container 1030 and/or blender base 1010.

Figure 11:
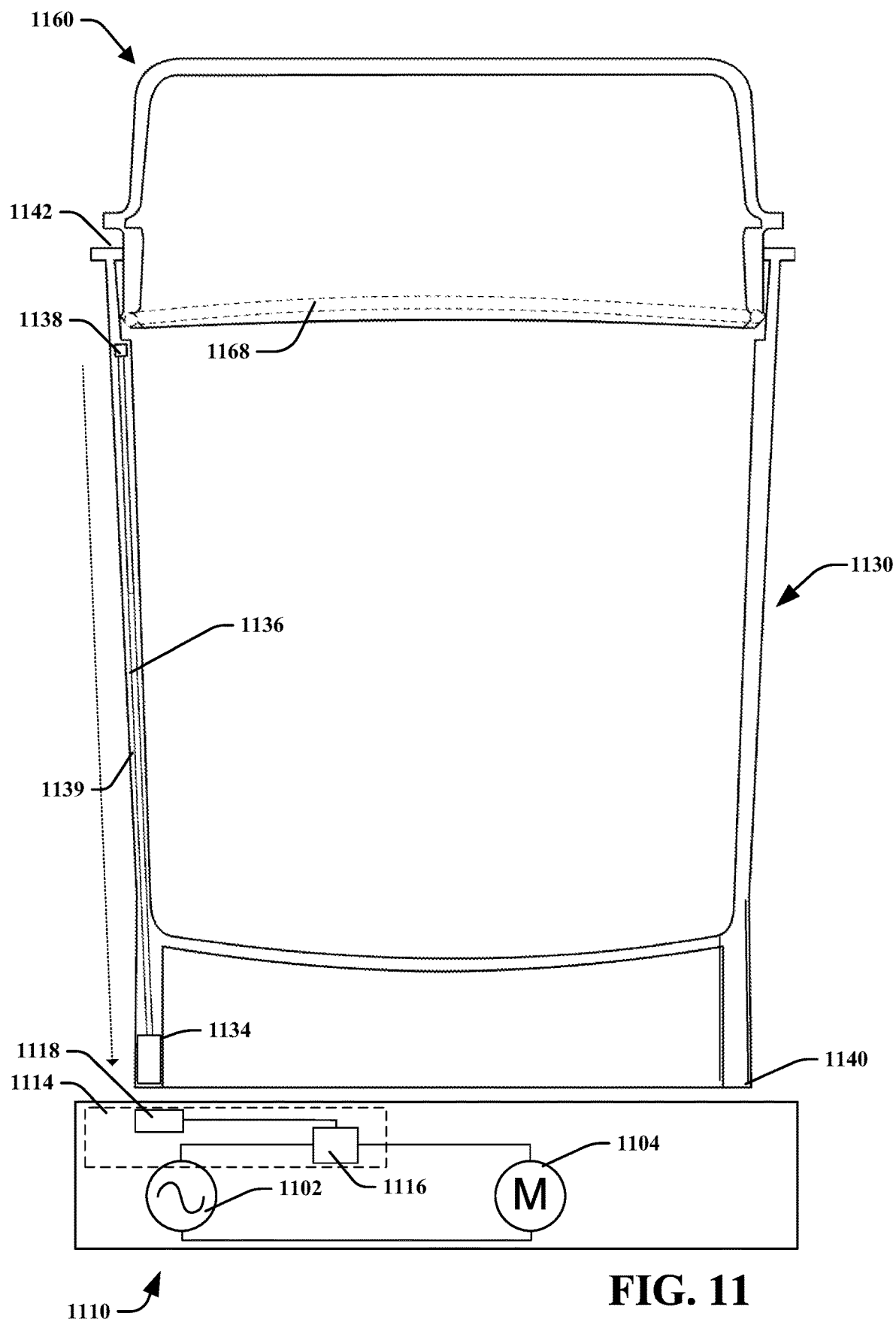
FIG. 11 is front view of a blending system including one or more reed switches in accordance with various disclosed aspects.

Turning to FIG. 11, there is a blender system 1100 comprising NFC communication capabilities, in accordance with various described aspects. It is noted that blender system 1100 may include all or some aspects as described with reference to FIGS. 7-13. Blender system 1100 may primarily include base 1110 (which may include NFC component 1114, motor 1104, and power source 1102), container 1130 (which may include NFC component 1134), and lid 1160. In an aspect, blender base 1110, container 1130 and lid 1160 may be interlocked together (e.g., as shown in FIGS. 7 and 9-13).

It is noted that NFC component 1114 may comprise a receiver/transmitter antenna 1118 and a reader 1116. The NFC component 1114 may communicate with NFC component 1134, which may include a transponder. It is noted that the NFC component 1134 (or a portion thereof that receives/transmits signals) may be disposed proximal to a closed end 1140 of container 1130. This may allow system 1100 to detect the NFC component 1134 when the blender base 1110, container 1130, and lid 1160 are operatively connected. In another aspect, this may prevent activation of a motor unless the container 1130 is in short proximity of the top of blender base 1110. It is further noted that the NFC component 1134 may be located orthogonally, in parallel, or otherwise angled with respect to a top surface of blender base 1110. If located orthogonally, to blender base 1110, the antenna 1118 may also be located orthogonally (e.g., parallel to NFC component 1134) when the blender base 1110 and the container 1130 are operatively coupled.

According to embodiments, the NFC component 1134 may comprise a transponder or coil that may be disposed proximal to a closed end 1140 of container 1134. The coil may include one or more connection lines 1136 (e.g., wires) which may extend within or on wall 1139 from proximal the closed end 1140 of container 1130, to proximal an open end 1142 of container 1130. The connection lines 1136 may be coupled with or include one or more reed switches 1138. In an example, the reed switches 1138 may include y reed switches, where y is a number. For instance, reed switches 1138 may include two reed switches that may be disposed at various locations proximal open end 1142. Reed switches 1138 may be in a closed or open state based on lid 1160.

Lid 1160 may include a triggering member, such as one or more magnet(s) 1168. Magnet 1168 may include individual magnets, a magnetic band or strip, or the like. The magnet 1168 may be covered (e.g., over molded, etc.), disposed within lid 1160, or the like. In an example, a user may place lid 1160 on the container 1130 and may operatively attach the lid 1160 there to (e.g., press fit, screw on, latch, etc.). When operatively attached, the magnet 1168 may engage (e.g., close) the reed switches 1138. This may close the coil of NFC component 1134. If the user removes the lid 1160, the magnet 1168 will not engage the reed switches 1138 and the reed switches 1138 will be open. System 1100 may provide selective power to a motor based on a state of the reed switches 1138. For instance, when closed, the NFC component 1134 may transmit; when open, the NFC component 1134 may not transmit.

While blender system 1100 describes reed switches 1138 and magnet 1168, it is noted that embodiments may utilize other switches or mechanisms to detect whether lid 1160 is operatively attached to container 1130. For instance, embodiments may utilize other interlock components, such as other proximity sensors like mechanical switches, pressure sensors, or the like.

FIG. 12 is a blender system 1200 comprising NFC communication capabilities, in accordance with various described aspects. It is noted that blender system 1100 may include all or some aspects as described with reference to FIGS. 1-6. Blender system 1200 may primarily include blender base 1210 (which may include NFC component 1214), container 1230 (which may include NFC components 1234 and 1236), and lid 1260 (which may comprise a triggering member, such as an NFC component 1264). In an aspect, blender base 1210, container 1230 and lid 1260 may be interlocked together. As described herein, system 1200 may include an enclosure that may be operatively attached to the blender base 1210.

As described herein, blender container 1230 may include one or more NFC components (734, 1236, etc.) that may each comprise transceivers/coils. The coils may be wound and connected in series. When system 1200 is operatively interconnected, NFC component 1236 may be powered via NFC component 1234 and connection lines 1237. In another aspect, NFC component 1236 may communicate with NFC component 1264 of lid 1260. In at least one embodiment blender container 1230 may include one NFC chip and multiple coils. Likewise, lid 1260 may include one NFC chip and multiple coils. While NFC component 1236 is shown as connected via a wired connection 1248 with NFC component 1234, it is noted that the NFC components 1234/736 may communicate wirelessly.

Figure 13:
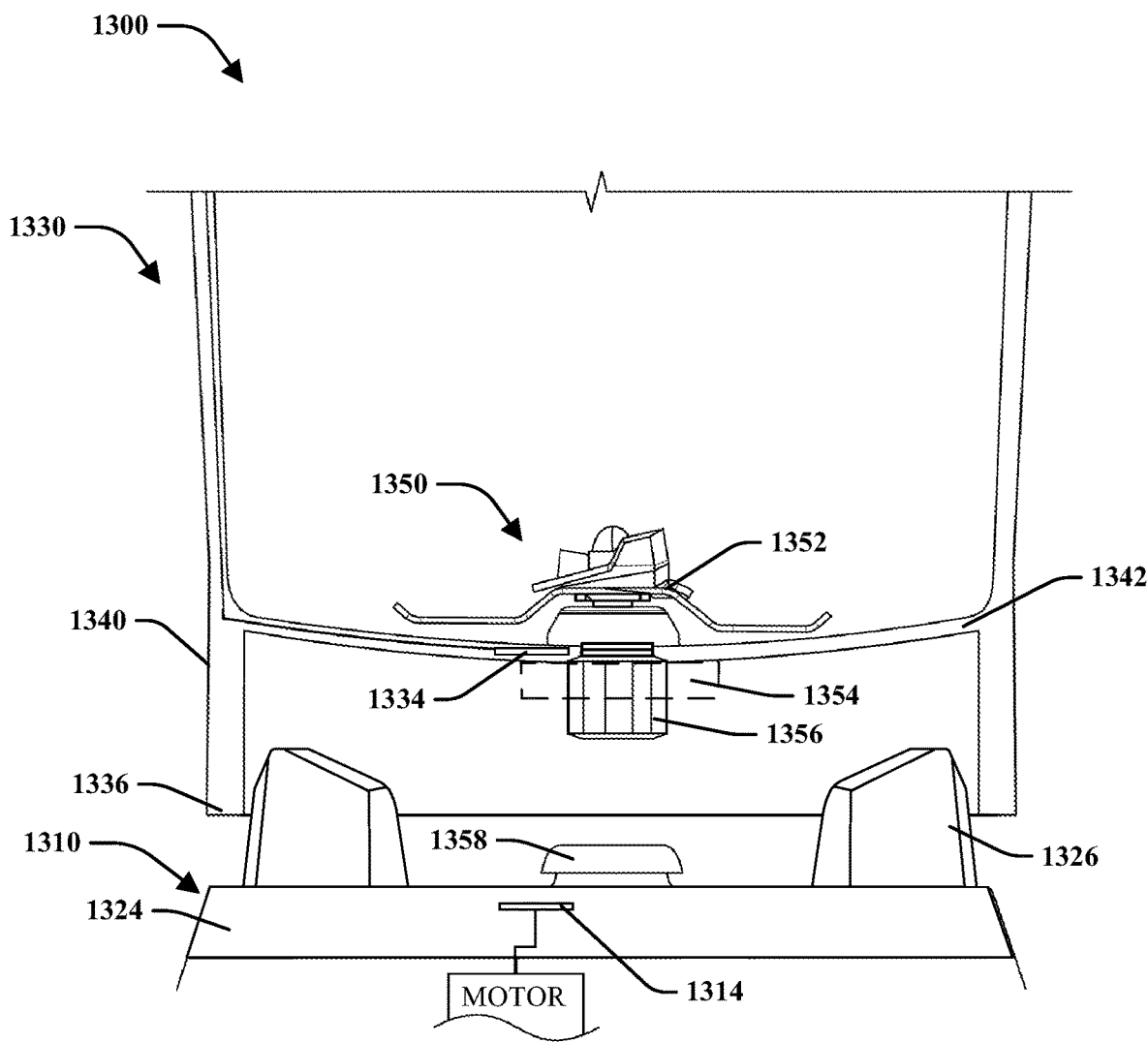
FIG. 13 is a partial, cross-sectional view of a blending system including a container NFC component, a base NFC component, and a motor.

Turning now to FIG. 13, there is a blender system 1300 that may determine whether it is interlocked in accordance with various described aspects. It is noted that similarly named components may comprise similar, different, or identical features or functionality. For example, base 1310 may be the same or a different base as base 610, 710, etc. It is further noted that system 1300 may be modified, combined, or altered in accordance with the scope and spirit of the present teachings. For instance, system 1300 may include a lid and other components as described with reference to the various disclosed embodiments.

System 1300 may include a container 1330 that may be interlocked with a base 1310. The container 1330 may include at least one NFC component 1334 that may communicate with an NFC component 1314 of the base 1314. In an aspect, the NFC component 1334 and NFC component 1314 may have limited coverage areas, such that they communicate when the container 1330 and base 1310 are substantially interlocked, and they do not communicate when the container 1330 and base 1310 are not substantially interlocked. This may allow a controller to enable or disable a motor 1304, which may allow/prevent the motor 1304 from driving the blade assembly 1350.

As depicted, the NFC component 1334 may be disposed within a wall of closed end 1342. In an aspect, the NFC component 1334 may be disposed proximal a blade assembly 1350 and/or a central point of the closed end 1342. In this arrangement, the NFC component 1314 may be generally disposed proximal a splined coupler 1358, which receives a splined shaft 1356 of the blade assembly 1350. In this way, NFC component 1314 and NFC component 1334 may be within range of each other no matter the orientation of the container 1330 relative the base 1310. It is noted that various other arrangements are contemplated. For instance, NFC components or antennas may be disposed within protrusions 1326, apron 1340, at various portions of closed end 1342 (e.g., proximal protrusions 1326 when interlocked), near proximal end 1336, or the like.

Figure 14:
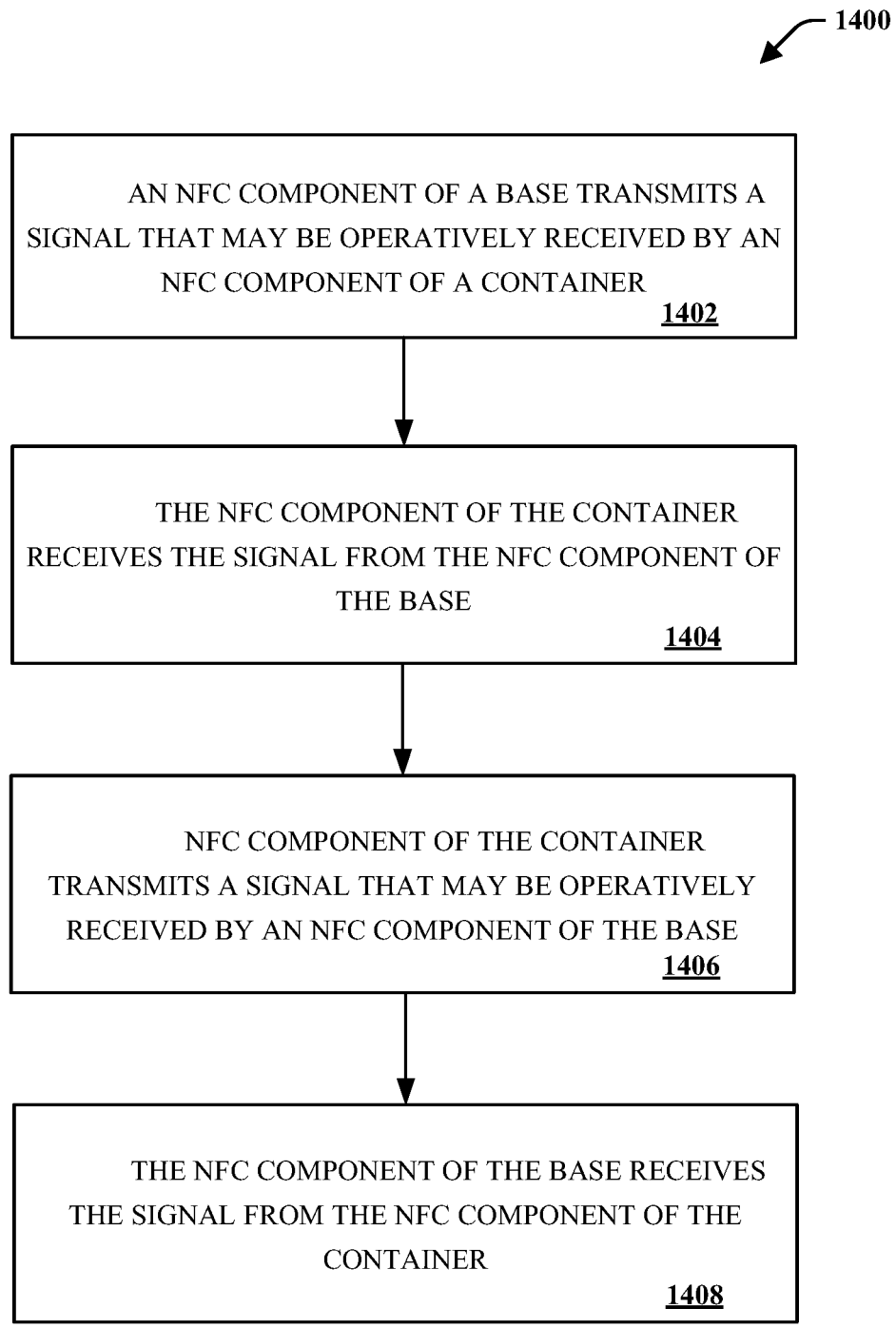
FIG. 14 is a method of operating a blender system in accordance with various disclosed embodiments.
Figure 15:
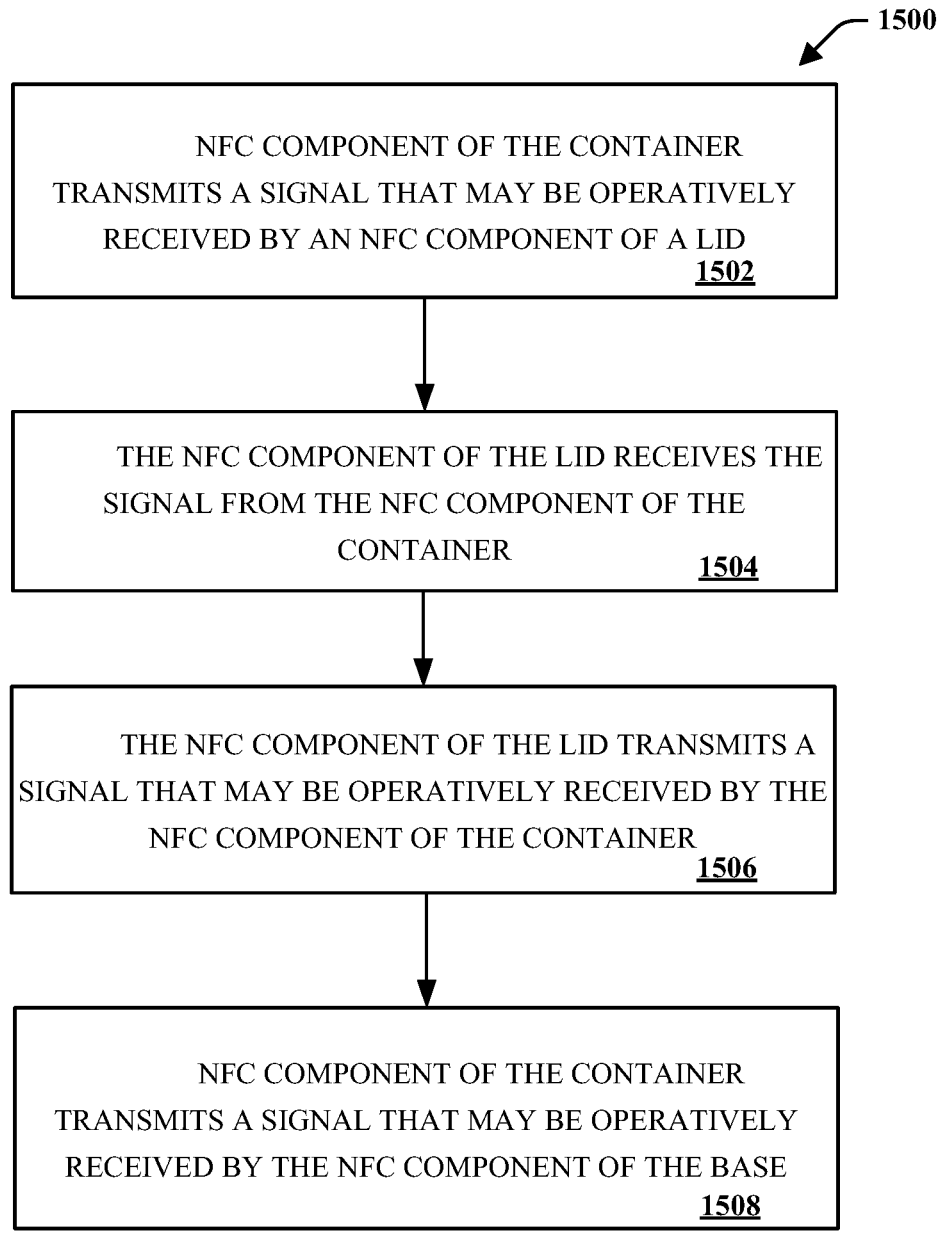
FIG. 15 is a method of operating a blender system comprising a container, base, and lid in accordance with various disclosed embodiments.

In view of the subject matter described herein, a method that may be related to various embodiments may be better appreciated with reference to the flowcharts of FIGS. 14-15. While methods 1400 and 1510 are shown and described as a series of blocks, it is noted that associated methods or processes are not limited by the order of the blocks. It is further noted that some blocks and corresponding actions may occur in different orders or concurrently with other blocks. Moreover, different blocks or actions may be utilized to implement the methods described hereinafter. Various actions may be completed by one or more of users, mechanical machines, automated assembly machines (e.g., including one or more processors or computing devices), or the like.

FIG. 14 depicts an exemplary flowchart of non-limiting method 1400 associated with a blender system, according to various aspects of the subject disclosure. At 1402, an NFC component of a base (e.g., NFC component 714, etc.) may transmit a signal that may be operatively received by an NFC component of a container. The signal may comprise an operative coverage area where the signal may be received by the NFC component of the container. While described relative a container and a base, it is noted that other components may be utilized. For example, a base may communicate with an NFC component within an enclosure.

At 1404, the NFC component of the container (e.g., NFC component 734, etc.) operatively receives the signal from the NFC component of the base. In an aspect, the NFC component of the container may receive the signal when the container is interlocked with the base. The signal may excite the NFC component of the container as described herein. It is noted that the signal may comprise a request, query, listening procedure, or the like.

At 1406, the NFC component of the container transmits a signal (e.g., a response signal) that may be operatively received by an NFC component of the base. For example, the response signal may comprise an acknowledgment that the NFC component of the container received the signal from the NFC component of the base. It is noted that the response signal may comprise other or different information, such as a container ID, usage data, recipes, or the like.

At 1408, the NFC component of the base receives the signal from the NFC component of the container. The NFC component of the base may utilize the signal to allow a motor to operate, update stored information, track a history of the container, receive recipes, or the like. In an aspect, method 1400 may allow a system (e.g., system 600, 700, etc.) to determine whether a container and a blender base are interlocked. For instance, an NFC component of a blender base may transmit a signal that may be receivable by an NFC component of a container.

At 1404, the system may receive input from an NFC component of the container. For instance, the NFC component of the container may receive a signal and/or power from the NFC component of the blender base. The signal may excite the NFC component of the container and the NFC component of the container may transmit a signal to be received by the NFC component of the blender base.

FIG. 15 depicts an exemplary flowchart of non-limiting method 1510 associated with a blender system, according to various aspects of the subject disclosure. The method 1510 may be utilized to determine whether a blender system comprising a lid, container, and base is interlocked. It is noted that the method may be utilized for other or different purposes, such as with an enclosure in addition to or as an alternative to other components. In an aspect, an NFC component of a base may transmit a signal to an NFC component of a container similar to reference numerals 1402 and 1404.

At 1502, the NFC component of the container operatively transmits a signal that may be operatively received by an NFC component (e.g., NFC component 964, etc.) of a LID. It is noted that the container may comprise one or more NFC tags that may transmit the same or different signals.

At 1504, the NFC component of the lid receives the signal from the NFC component of the container. For instance, the signal may excite and/or power the NFC component of the lid. Exciting the NFC component of the lid may induce a reaction or response.

At 1506, the NFC component of the lid may transmit a signal (e.g., response signal) that may be operatively received by the NFC component of the container, or an enclosure. For instance, the NFC component of the lid, in response to excitement, may execute one or more instructions that may result in a responsive signal transmitted to the lid. The NFC component of lid may then receive the responsive signal, and in response, communicate with the base (e.g., which may include transmitting via one or more NFC components of the container).

At 1506, the NFC component of the container transmits a signal that may be operatively received by the NFC component of the base, or an enclosure (which may include one or more NFC components that operatively communicate with NFC components of the base, the container, the lid, a cover, or the like). The base may determine whether the system is interlocked, whether the lid is not attached, whether an enclosure is attached, whether an enclosure is in an open or closed state, or the like. In an aspect, the base may comprise a display that generates a notification to a user to identify that the lid is not interlocked.

Figure 17:
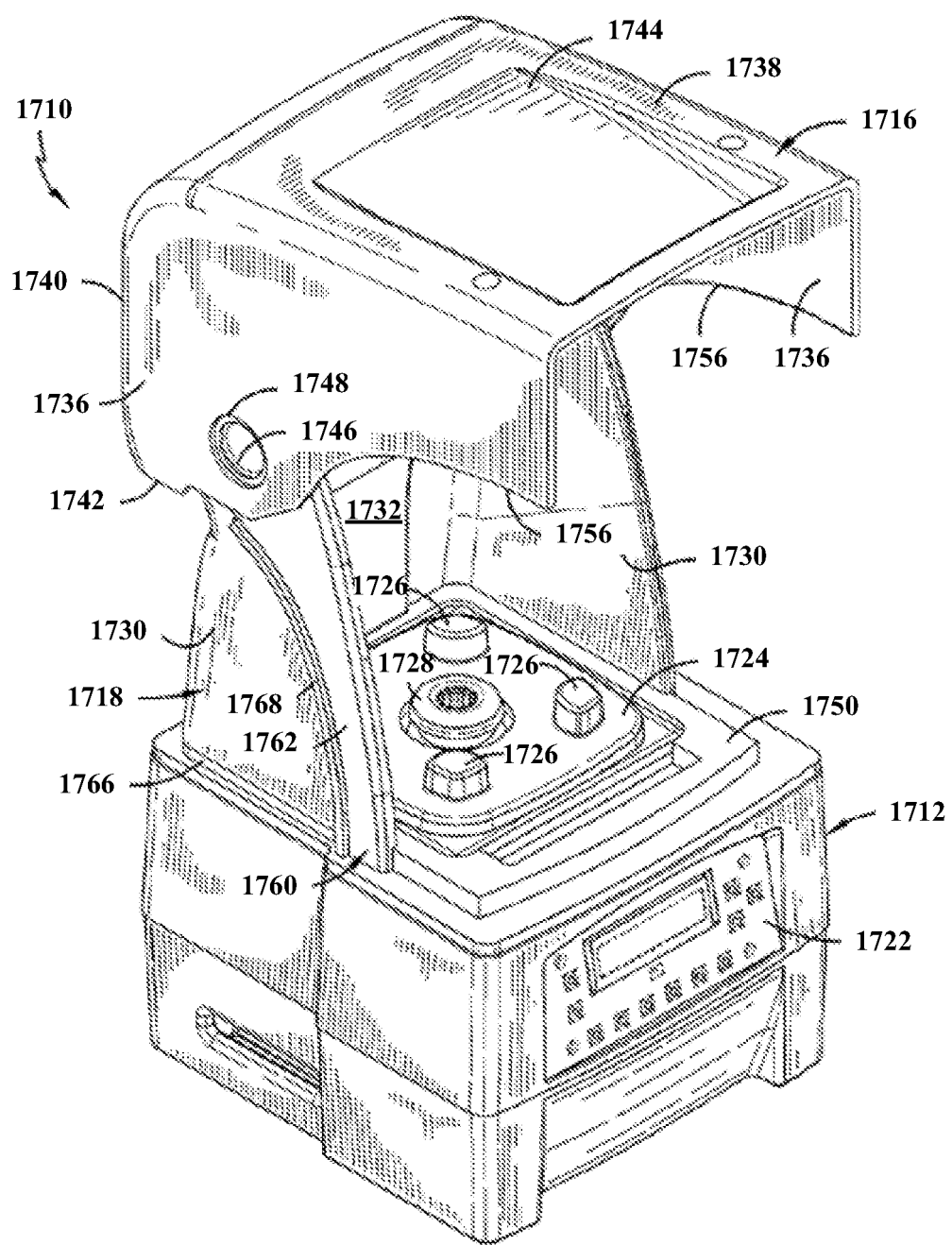
FIG. 17 is a perspective view of a blending system and enclosure in accordance with various disclosed aspects.

One embodiment of an enclosure for a blending system made in accordance with the present invention is shown in FIG. 17 and is indicated generally by the numeral 1710 and may be utilized with various disclosed embodiments. The blending system includes a base member, generally indicated by the numeral 1712, which houses a motor to operate the blender. Enclosure 1710 includes a cover 1716 and a body portion 1718 that is designed to be attached to base member 1712. The blending system further includes a container (not shown), which has a set of rotating blades therein, and which is used to contain and mix ingredients. As such, the container of the blending system is positioned on the base member 1712 and housed within enclosure 1710 during blending to muffle the noise generated by operation of the blender.

Base member 1712 often includes a control panel 1722 on one of its surfaces where the blender can be turned on and off, and the speed of rotation of the motor can be adjusted. An opening (not shown) may also be provided in base member 1712 so that an electric cord can pass from within to provide power to the motor housed within base member 1712. Base member 1712 also includes a raised pedestal 1724 on a top surface thereof, which is adapted to be received in a base portion of the container. Pedestal 1724 may include one or more pads 1726 which, when received by the base portion of the container, prevent the container from rotating when the motor within base member 1712 is actuated. In addition, pedestal 1724 also receives a splined end 1728 of a rotating motor shaft therethrough. A splined drive shaft, which extends from the blender blades within the container, engages the splined end of the rotating motor shaft in base member 1712. Rotation of the motor shaft caused by actuation of motor 1714 is thereby transferred to the draft shaft and the blades rotatably positioned within the container, as is well known in the art.

Body portion 1718 of enclosure 1710 includes opposed sidewalls 1730 spanned by a rear wall 1732 and an abbreviated top wall (not shown). Body portion 1718 has an open front area opposed to rear wall 1732, which front area is closed by cover 1716 to form enclosure 1710. Cover 1716 includes opposed sidewalls 1736 spanned by a front wall 1738, back edge 1756 of cover sidewalls 1736, a top wall 1740, and an abbreviated back wall 1742. Cover sidewalls 1736, front wall 1738 and top wall 40 are sized and spaced laterally such that cover 1716 may fit over an overlap body portion sidewalls 1730.

Cover 1716 and body portion 1718 may be made of a clear thermoplastic material, such as polycarbonate or polyester, so that the container of the blender can be viewed when positioned on the base member 1712 with cover 1716 in a closed position. Alternatively, windows 1744 may be provided in both cover 1716 and body portion 1718 to allow a container within enclosure 1710 to be viewed.

Cover 1716 may be pivotally connected to body portion 1718 by any method known in the art, such that it can be moved from a closed position to an open position, allowing access to the interior of enclosure 1710. As such, a hinge assembly may be formed by a pair of sockets 1746 on sidewalls 1730 of body portion 1718 and a pair of corresponding apertures 1748 in sidewalls 1736 of cover 1716. Apertures 1748 are sized to fit over sockets 1746. Thus, when sockets 1746 are positioned within apertures 1748, cover 1716 is rendered pivotable with respect to body portion 1718 on an axis defined by sockets 1746.

Body portion 1718 also includes a foot 1750 at the bottom of sidewalls 1730 and rear wall 1732, foot 1750 being adapted to secure enclosure 1710 to the base member 1712 of the blending system. Foot 1750 may be secured to the base member 1712 by any method known to persons skilled in the art, such as, for example, by tongue and groove attachment, with the use of fasteners including thumb screws, or by magnetic means. A vibration dampening seal may optionally be provided between foot 1750 and base member 1712 to reduce the vibrations transferred from base member 1712 to enclosure 1710, thereby further reducing the noise created by the blending system.

A gasket, generally indicated by the numeral 1760 may be fitted over a portion of body portion 1718 of enclosure 1710 to create a seal when cover 1716 is in a closed position. Gasket 1760 includes side portions 1762, a top portion (not shown) extending between laterally spaced side portions 1762, a lip 1768, and may optionally include a bottom portion 1766. Gasket 1760 is a single integral piece that is molded to fit snuggly over body portion 1718 and may be secured to body portion 1718 by any method known to those skilled in the art, including, for example, by providing an adhesive between gasket 1760 and body portion 1718. Gasket 1760 may be made of any material capable of providing a sound and vibration dampening seal against cover 1716, such as, for example, a thermoplastic elastomer. Gasket 1760 provides a sealing surface for cover 1716 of enclosure 1710 when cover 1716 is in a closed position.

What has been described above includes examples of the present specification. It is, of course, not possible to describe every conceivable combination of components or methodologies for purposes of describing the present specification, but one of ordinary skill in the art may recognize that many further combinations and permutations of the present specification are possible. Each of the components described above may be combined or added together in any permutation to define embodiments disclosed herein. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A blender system comprising:
 a base including a motor and at least one first reed switch and a control circuit;
 a pedestal positioned on the base, wherein the pedestal comprises at least one engagement member;
 a container selectively positionable on the pedestal;
 an enclosure comprising at least one first magnet and at least one engagement channel, wherein the enclosure is selectively engageable with the pedestal wherein the at least one engagement member engages with the at least one engagement channel upon rotation of the enclosure relative to the pedestal and wherein the enclosure comprises a cover that is selectively movable to a closed orientation and an open orientation, wherein in the open orientation the container is capable of being inserted into the enclosure and positioned on the pedestal; and
 wherein, the at least one first magnet actuates the at least one first reed switch when the enclosure is operatively engaged with the pedestal and the cover is in the closed position and wherein the control circuit operatively allows the motor to rotate in response to determining the first magnet actuates the at least one first reed switch and the enclosure is operatively engaged with the pedestal and the cover is in the closed position.

2. The blender system of claim 1, wherein the control circuit prohibits driving of the motor when the at least one first magnet does not actuate the at least one first reed switch.

3. The blender system of claim 1, wherein the container comprises at least one second magnet and wherein the base comprises at least one second reed switch, wherein the at least one second magnet actuates at least one second reed switch when the container is selectively and operatively positioned on the pedestal.

4. The blender system of claim 3, wherein the base permits driving of the motor when the at least one first magnet actuates the at least one first reed switch and the at least one second magnet actuates the at least one second reed switch, and
 wherein the base prohibits driving of the motor when the at least one of the at least one first magnet does not actuate the at least one first reed switch or the at least one second magnet actuates the at least one second reed switch.

5. The blender system of claim 3, wherein the at least one engagement member comprises four engagement members that are aligned with a central radius and extend a common distance from a central axis of the pedestal.

6. The blender system of claim 1, wherein the container comprises a lid operatively positionable on the container, and wherein the base operatively detects whether the container and lid are operatively attached.

7. The blender system of claim 1, wherein the at least one engagement channel comprises a retention lip and a back wall and wherein the at least one engagement member frictionally engages the retention lip and abuts the back wall when the enclosure is engaged with the pedestal.

8. The blender system of claim 7, wherein the retention lip comprises a twisted shape.

9. The blender system of claim 1, wherein the pedestal comprises a pad.

10. A blender system comprising:
 a base including a motor and a first interlock component;
 a pedestal extending from the base, the pedestal comprising at least one engagement member;
 an enclosure providing a sound barrier to said base, the enclosure comprising:
  a body portion including sidewalls and a cover portion, wherein a blending container is operatively positionable on the pedestal such that the body portion and the cover portion enclose the blending container, wherein the cover is positionable to an open state and a closed state, wherein the cover being in the open state permits insertion of the blending container into the enclosure;
  at least one engagement channel, wherein upon rotation of the enclosure relative to the pedestal the at least one engagement member engages with the at least one engagement channel securing the enclosure to the pedestal; and
  a second interlock component operatively interacting with the first interlock component; and
 wherein the base operatively controls operation of the motor based at least in part on whether the first interlock component is interacting with the second interlock component and wherein the first interlock component interacts with the second interlock component upon the enclosure being operatively positioned on the base; and
 a third interlock component, wherein the third interlock component is disposed within or on the cover portion of the enclosure and wherein the second interlock component is disposed within the body portion of the enclosure.

11. The blender system of claim 10, wherein the first interlock component comprises a reed switch and the second interlock component comprises a magnet.

12. The blender system of claim 10, wherein the at least one engagement member comprises four engagement members that are aligned with a central radius and extend a common distance from a central axis of the pedestal.

13. The blender system of claim 12, wherein the second interlock component further operatively interacts with the third interlock component, such that the base operatively controls operation of the motor based at least in part on the second interlock component interacting with the third interlock component and the second interlock component interacting with the first interlock component.

14. The blender system of claim 13, wherein the second interlock component includes at least one reed switch and the third interlock component comprises a magnet.

15. The blender system of claim 10, wherein the first interlock component comprises a first near-field communication device and the second interlock component comprises a second near-field communication device.

16. The blender system of claim 10, wherein the at least one engagement channel comprises a retention lip and a back wall and the at least one engagement member frictionally engages the retention lip and abuts the back wall when the enclosure is engaged with the pedestal.

17. The blender system of claim 10, wherein the first interlock component comprises a first near-field communication device, the second interlock component comprises a second near-field communication device, and the third interlock component comprises a third near-field communication device.

18. A blender system comprising:
a base comprising a motor, a pedestal and a control circuit comprising at least two proximity sensors, wherein the pedestal comprises at least one engagement member;
a container operatively attachable with a lid and the base; and
an enclosure comprising a body and a cover, wherein the cover is positionable between open and closed positions whereby in the open position the container is insertable into the container and the body comprises at least one channel member,
wherein the control circuit operatively allows the motor to rotate a splined coupler in response to determining that the blender system is in a first arrangement, wherein the enclosure is operatively attached to the base and that the cover is in a closed position, and wherein the control circuit does not operatively allow the motor to rotate the splined coupler in response to determining that the blender system is in a second arrangement, wherein the body is not operatively attached to the base and wherein in the first arrangement, the at least one engagement member is engaged with the at least one channel member.

19. The blender system of claim 18, wherein first arrangement further comprises the container being operatively attached to the base.

20. The blender system of claim 19, wherein first arrangement does not depend on whether or not the lid is operatively attached to the container, such that the control circuit operatively allows the motor to rotate a splined coupler when the blender system is in a first arrangement regardless of whether the lid is operatively attached to the container.

* * * * *